United States Patent
Grondin et al.

(10) Patent No.: US 10,135,854 B2
(45) Date of Patent: Nov. 20, 2018

(54) METHOD, APPARATUS, AND COMPUTER-READABLE MEDIUM FOR GENERATING A DATA PROLIFERATION GRAPH

(71) Applicant: Informatica LLC, Redwood City, CA (US)

(72) Inventors: Richard Grondin, Ste-Julie (CA); Gary Patterson, San Ramon, CA (US); Rahul Gupta, Dublin, CA (US); Ranjeet Tayi, Fremont, CA (US); Vikram Tyarla, Hyderabad (IN)

(73) Assignee: Informatica LLC, Redwood City, CA (US)

( * ) Notice: Subject to any disclaimer, the term of this patent is extended or adjusted under 35 U.S.C. 154(b) by 112 days.

(21) Appl. No.: 14/680,835

(22) Filed: Apr. 7, 2015

(65) Prior Publication Data

US 2016/0301708 A1 Oct. 13, 2016

(51) Int. Cl.
*H04L 29/06* (2006.01)
*H04L 29/08* (2006.01)

(52) U.S. Cl.
CPC ...... *H04L 63/1433* (2013.01); *H04L 63/1408* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 6,310,883 B1* | 10/2001 | Mann | ...... | H04L 45/12 370/408 |
| 6,871,196 B1* | 3/2005 | Chan | ...... | G06Q 10/10 706/45 |
| 7,493,570 B2* | 2/2009 | Bobbin | ...... | G06F 3/04842 715/800 |
| 8,417,715 B1* | 4/2013 | Bruckhaus | ...... | G06F 17/30994 705/26.1 |
| 2003/0070153 A1* | 4/2003 | Stevens | ...... | G06F 17/5077 716/126 |
| 2005/0154974 A1* | 7/2005 | Gao | ...... | G06F 17/246 715/228 |
| 2006/0059172 A1* | 3/2006 | Devarakonda | .... | G06F 17/30067 |
| 2007/0280117 A1* | 12/2007 | Katz | ...... | H04L 12/24 370/238 |
| 2007/0296581 A1* | 12/2007 | Schnee | ...... | G06Q 10/08 340/572.1 |
| 2008/0091656 A1* | 4/2008 | Charnock | ...... | G06F 17/30713 |

(Continued)

*Primary Examiner* — Jason Chiang
(74) *Attorney, Agent, or Firm* — Amardeep S. Grewal; Reed Smith LLP

(57) ABSTRACT

An apparatus, computer-readable medium, and computer-implemented method for generating a data proliferation graph, including receiving a selection of a target data store, identifying a plurality of data stores which have either received data that was previously on the target data store or which have sent data that was subsequently on the target data store, the plurality of data stores being divided into a plurality of proliferation levels corresponding to degrees of separation from the target data store and direction of data propagation relative to the target data store, generating a data proliferation graph, and transmitting at least one portion of the data proliferation graph.

66 Claims, 35 Drawing Sheets

(56) References Cited

U.S. PATENT DOCUMENTS

| | | | | |
|---|---|---|---|---|
| 2008/0320075 A1* | 12/2008 | Livshits | ............... | H04L 63/145 709/203 |
| 2010/0008368 A1* | 1/2010 | Karloff | ................ | H04L 45/128 370/400 |
| 2011/0320460 A1* | 12/2011 | Fankhauser | ............ | G06Q 10/10 707/748 |
| 2012/0179726 A1* | 7/2012 | Roberts | .................. | G06F 8/433 707/798 |
| 2012/0179990 A1* | 7/2012 | Curbera | ............ | G06F 17/30312 715/771 |
| 2012/0278476 A1* | 11/2012 | Agrawal | ................ | G06Q 50/01 709/224 |
| 2013/0159096 A1* | 6/2013 | Santhanagopal | ...... | G06Q 50/01 705/14.49 |
| 2013/0239089 A1* | 9/2013 | Eksten | ..................... | G06F 8/70 717/120 |
| 2013/0346900 A1* | 12/2013 | Matejka | ............ | G06F 17/30716 715/771 |
| 2015/0249676 A1* | 9/2015 | Koyanagi | ........... | H04L 63/1425 726/22 |
| 2016/0179965 A1* | 6/2016 | Bhatia | ............... | G06F 17/30867 707/749 |

\* cited by examiner

METHOD, APPARATUS, AND COMPUTER-READABLE MEDIUM FOR GENERATING A DATA PROLIFERATION GRAPH

BACKGROUND

Data lineage refers to a data life cycle that includes the data's origins and destinations and where it moves over time. Data lineage can also describe what happens to data as it goes through diverse processes. For example, data lineage for a particular document can include information indicating the locations where the document has been stored, where the document has been transmitted or received, and any alterations or changes to the document that may have occurred at each location.

Data lineage tracking and visualization is sometimes used in the field of business intelligence, which involves gathering data and building conclusions from that data. For example, data lineage tracking can be used to determine how sales information has been collected and identify what role it could play in new or improved processes within a business or organization. The data lineage can also be useful in designing improved processes.

Another use of data lineage is in safeguarding data and reducing risk. By collecting large amounts of data, businesses and organizations expose themselves to various legal, business, and/or security risks. For example, a security breach on a business server could result in the release of confidential or sensitive data, such as credit card numbers or personal information of users. Data lineage collection and analysis can be used to mitigate some of the risk by identifying the locations of various items of data at different points in time.

DETAILED DESCRIPTION

While methods, apparatuses, and computer-readable media are described herein by way of examples and embodiments, those skilled in the art recognize that methods, apparatuses, and computer-readable media for generating a data proliferation graph are not limited to the embodiments or drawings described. It should be understood that the drawings and description are not intended to be limited to the particular form disclosed. Rather, the intention is to cover all modifications, equivalents and alternatives falling within the spirit and scope of the disclosure. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Data lineage information can be expressed in visual form as a data proliferation graph in order to aid a user, administrator, or expert who is analyzing the data lineage information. However, in many business and commercial environments, the sheer volume of data, the large number of locations through which data passes, and the various properties associated with each of those locations makes effectively modeling, visualizing, and analyzing data lineage very difficult.

For example, a data proliferation graph which models data lineage could contain hundreds or thousands of objects corresponding to various servers, as well as lineage dependencies for each of those objects. Additionally, each object can have various properties which are also difficult to convey in the context of a data proliferation graph.

In these situations, it is difficult for users to quickly identify a specific data lineage or object of interest. It is also difficult to identify objects (corresponding to data stores or servers) which have particular characteristics and to navigate or focus on any specific section of the data proliferation graph. Furthermore, there is no way for users to define selection criteria at different levels within a data proliferation graph to identify potentially problematic data stores or servers.

The inventors have discovered a method and system for generating a data proliferation graph which solves the above-stated problems and allows for effective visualization of large quantities of data lineage information. The method and system disclosed herein enables a user to quickly identify objects or lineages of interest in a data proliferation graph and provides various tools which further aid visual and/or computational analysis of data lineage information.

Figure 1:
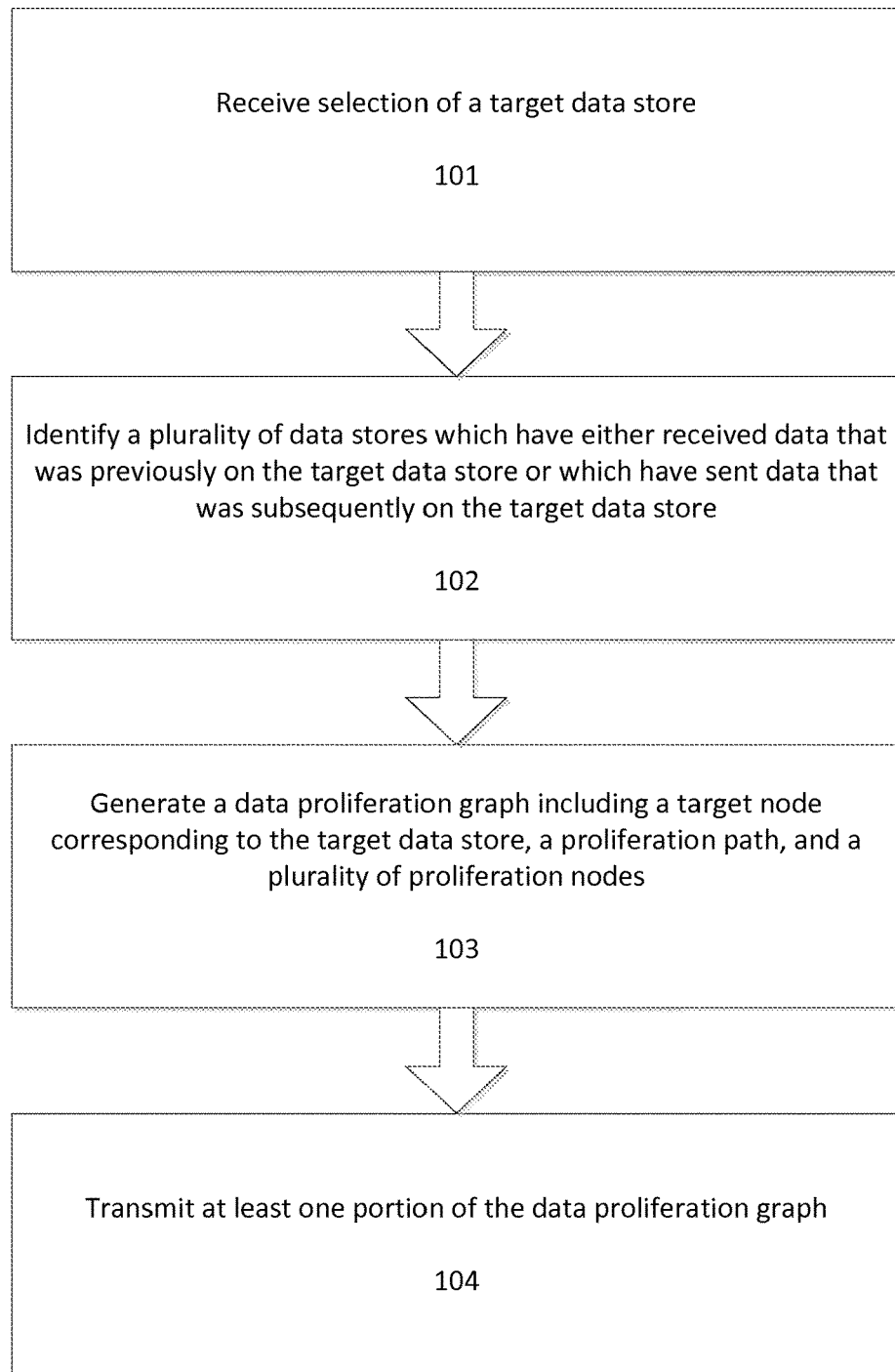
FIG. 1 illustrates a flowchart for generating a data proliferation graph according to an exemplary embodiment.

FIG. 1 illustrates a flowchart for a generating a data proliferation graph according to an exemplary embodiment. At step 101 a selection of a target data store is received. The selection can be received through a user interface, such as by a user clicking on an icon or indicator corresponding to a particular data store. The selection can also be made by a user loading information corresponding to a particular data store and then selecting that data store as a target data store to generate a data proliferation graph or selecting a "generate graph" option while viewing information corresponding to a particular data store.

A data store can be a data server, a database, a computing device which stores data (such as user or client computer) or any other computing device or storage device which stores, receives, or transmits data (such as a set-top box for a television, a mobile device, etc.). Additionally, a data store does not have to correspond to an entire physical machine but can correspond to a portion of a memory or disk or a collection of data associated with a particular entity. For example, a data store can be a profile or account associated with a user, such as a social media or networking site profile or Twitter™ account. In this case, data proliferation can correspond to the spread of information (such as news articles or memes) between various users of a social networking site or social media application.

At step 102 a plurality of data stores which have either received data that was previously on the target data store or which have sent data that was subsequently on the target data store are identified. In other words, data stores which are "downstream" of the target data store or data stores which are "upstream" of the target data store are identified. Optionally, a user can indicate they would only like to conduct a downstream or upstream analysis, in which cause only data stores which have received data that was previously on the target data store or only data stores which have sent data that was subsequently on the target data store would be identified.

Figure 2:
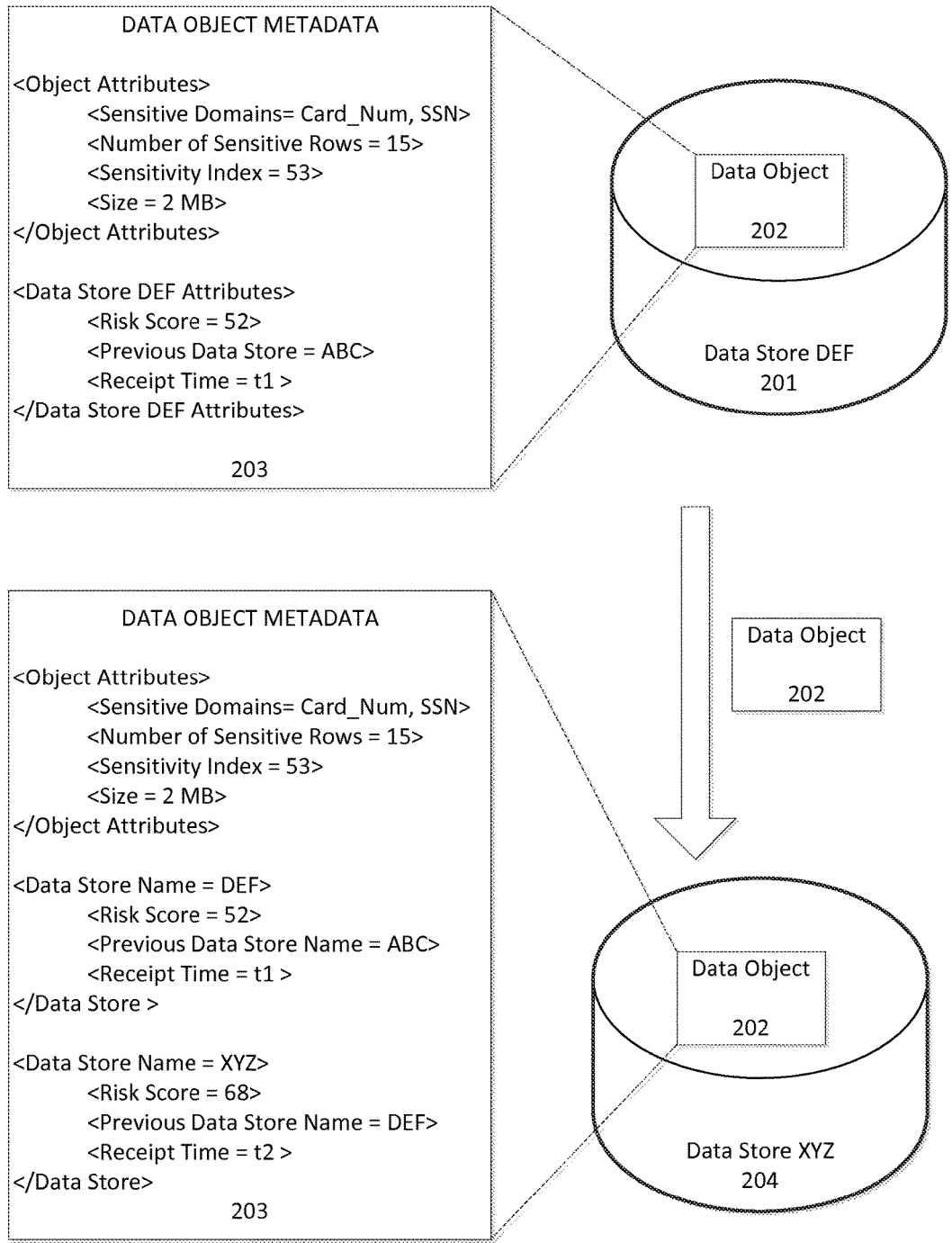
FIG. 2 shows a process of adding tags to data object metadata according to an exemplary embodiment.

The plurality of data stores can be identified based at least in part on metadata tags embedded in the data which track one or more locations of the data. For example, FIG. 2 illustrates the addition of metadata tags to a data object 202 as it passes between data stores. The data object metadata 203 corresponding to data object 202 is shown when the data object 202 is stored in data store DEF 201.

As shown in the figure, the data object metadata 203 can include information about the data object 203 such as the sensitive domains, the number of sensitive rows, and a sensitivity index indicating the overall sensitivity of the data, a size, or any other metadata describing the object.

The data object metadata 203 also initially includes tags corresponding to data store DEF 201. These tags can include information about that data store, such as a risk score indicating a security risk level associated with the data score (which is shown in the figure), a data volume size, or any other characteristics or metadata describing data store DEF. The data object metadata can include lineage information. In this case, the lineage information is associated with data store DEF 201 and indicates the previous data store which stored the data object 202, which is data store ABC, as well as the time of receipt of the data object 202, which is indicated as "t1." Of course, the data lineage information, object metadata, and data store metadata can be stored in the data object metadata in a various ways, and this example is not intended to be limiting. For example, the data lineage can be stored as a list of data stores traversed by the data object in chronological order without including additional details about each of the data stores or receipt time.

As shown in FIG. 2, when the data object 202 passes to data store XYZ 204, the data object metadata 203 is updated to reflect that the data object 202 was stored on data store XYZ, to include metadata corresponding to data store XYZ, and to include a receipt time of the data object at data store XYZ.

The specific attributes of the data objects passing through data stores, as well as the data lineage, and/or the data store characteristics can then be collected or harvested for a volume of data that has passed through various data stores by analyzing the data object metadata for each data object in the volume of data. This process can be performed as part of a discovery or classification step prior to the generation of the data proliferation graph. In the case where the data stores correspond to profiles of users on a social media/networking site, this process can be performed by analyzing data collected by the social media/networking host or provider or by analyzing data embedded in various communications (such as posts or messages) between users.

The plurality of data stores are divided into a plurality of proliferation levels corresponding to degrees of separation from the target data store and direction of data propagation relative to the target data store. For example, data stores that are downstream of the target data store (data stores which have received data that was previously on the target data store) can be divided into a plurality of downstream proliferation levels corresponding to the degrees of separation downstream of the target data store. In this case, the direction of data propagation relative to the target data store is away from the target data store. Similarly, data stores that are upstream of the target data store (data stores which have sent data that was subsequently on the target data store) can be divided into a plurality of upstream proliferation levels corresponding to the degrees of separation upstream of the target data store. In this case, the direction of data propagation relative to the target data store is towards the target data store.

Figure 3:
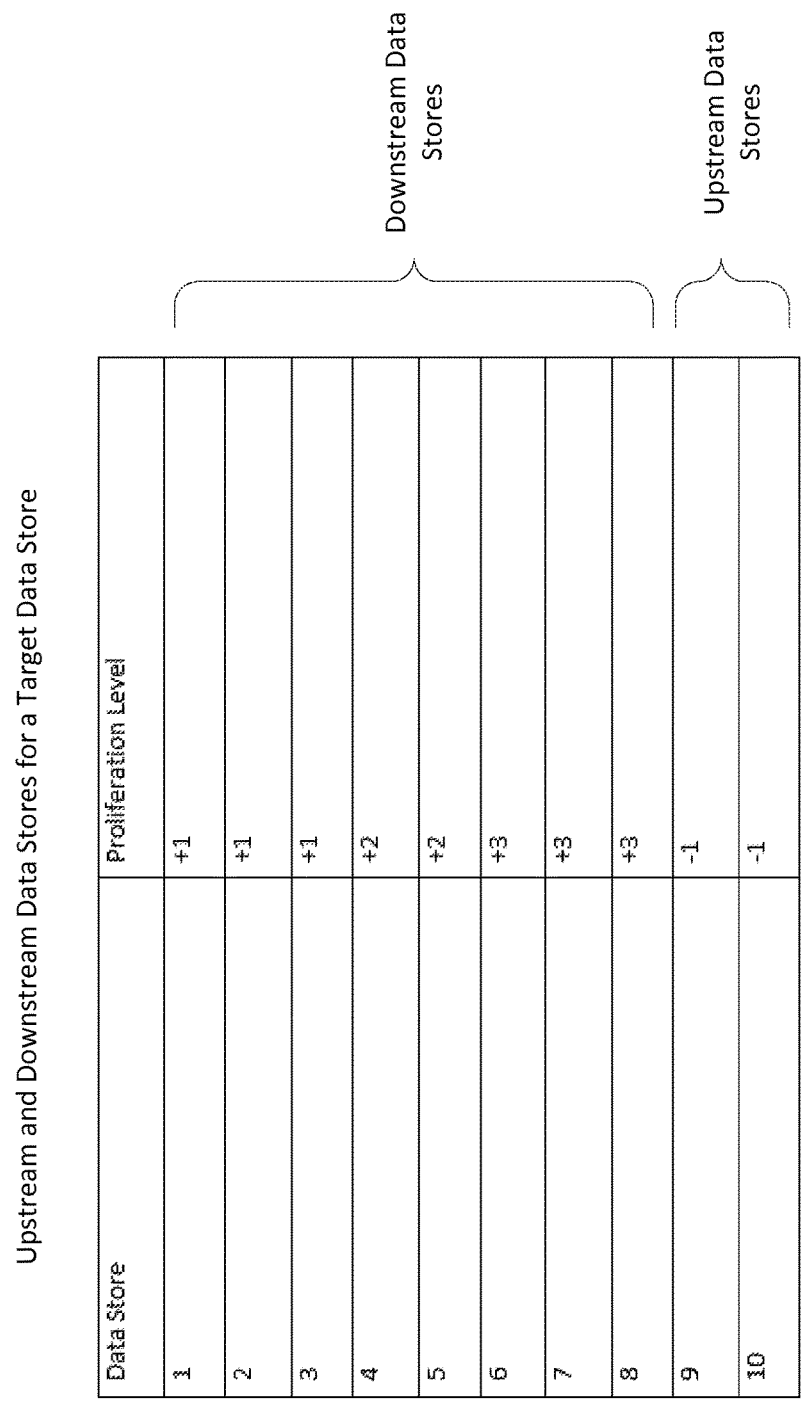
FIG. 3 illustrates a table of upstream and downstream data stores for a target data store according to an exemplary embodiment.

For example, FIG. 3 shows a table 301 which includes a plurality of identified data stores corresponding to a particular target data store. As shown in the table 301, there are eight downstream data stores which have been divided into a plurality of downstream proliferation levels (denoted here by positive numbers) corresponding to degrees of separation downstream from the target data store. For example, data store 6 has a proliferation level of +3 corresponding to three degrees of separation downstream from the target data store.

Similarly, table 301 shows two upstream data stores which have an upstream proliferation level (denoted here by a negative number) of −1 corresponding to one degree of separation upstream from the target data store.

Returning to FIG. 1, at step 103 a data proliferation graph is generated for the target data volume. The data proliferation graph includes a target node corresponding to the target data store and includes a proliferation path corresponding to one or more of an upstream route and a downstream route of at least a portion of the data through the target data store and one or more of the plurality of data stores. Therefore, the proliferation path includes the target data store and at least a portion of the plurality of data stores. As indicated above, the data proliferation graph can include a proliferation path which corresponds only to a downstream route of at least a portion of the data, a proliferation path which corresponds only to an upstream route of at least a portion of the data, or a proliferation path which corresponds to both an upstream and downstream route of at least a portion of the data.

Since all of the data that passes through a target data store does not necessarily follow the same route, only a portion of the data passing through the target data store would follow the particular route corresponding to the proliferation path.

The data proliferation graph also includes a plurality of proliferation nodes corresponding to data stores in the proliferation path and one or more of all immediate parents of the data stores in the proliferation path for an upstream route and all immediate children of the data stores in the proliferation path for a downstream route. Whether a route is an upstream route or a downstream route is based on the direction of data propagation relative to the target data store. So an upstream route refers to a route in which data is traveling towards the target data store and a downstream route refers to a route in which data is traveling away from the target data store.

As indicated above, for data stores which are downstream of the target data store (for a downstream route), the plurality of proliferation nodes include all of the immediate children of the data stores in the proliferation path. An immediate child of a data store refers to a data store which is one degree of separation downstream of a particular data store and which has received data from that data store. Similarly, for data stores which are upstream of the target data store (for an upstream route), the plurality of proliferation nodes include all of the immediate parents of the data stores in the proliferation path. An immediate parent of a data store refers to a data store which is one degree of separation upstream of a particular data store and which has sent data to that data store.

If the data proliferation graph includes both upstream and downstream routes (which can be toggled or selected by a user as will be explained further below), then the plurality of proliferation nodes can correspond to data stores in the proliferation path and all immediate parents of the data stores in the proliferation path for the upstream route and all immediate children of the data stores in the proliferation path for the downstream route. Alternatively, if the data proliferation graph includes only an upstream route, then the plurality of proliferation nodes can correspond to data stores in the proliferation path and all immediate parents of the data stores in the proliferation path for the upstream route. Similarly, if the data proliferation graph includes only a downstream route, then the plurality of proliferation nodes can correspond to data stores in the proliferation path and all immediate children of the data stores in the proliferation path for the downstream route.

The data proliferation graph can be generated so that the target node is located in a "target" column of the data proliferation graph and that the plurality of proliferation nodes are located in a plurality of proliferation columns corresponding to the plurality of proliferation levels. The proliferation columns can be spaced relative to the target column based on the proliferation level. For example, a proliferation column for a proliferation level of +1 (downstream one degree of separation) can be immediately to the right of the target column whereas a proliferation column for a proliferation level of +1 (upstream one degree of separation) can be immediately to the left of the target column.

At step 104, at least one portion of the data proliferation graph is transmitted. For example, a portion of the data proliferation graph can be transmitted in a user interface on a display, such as a computer monitor or screen. Of course, if the data proliferation graph is not large, then the entire data proliferation graph can also be transmitted.

Figure 4A:
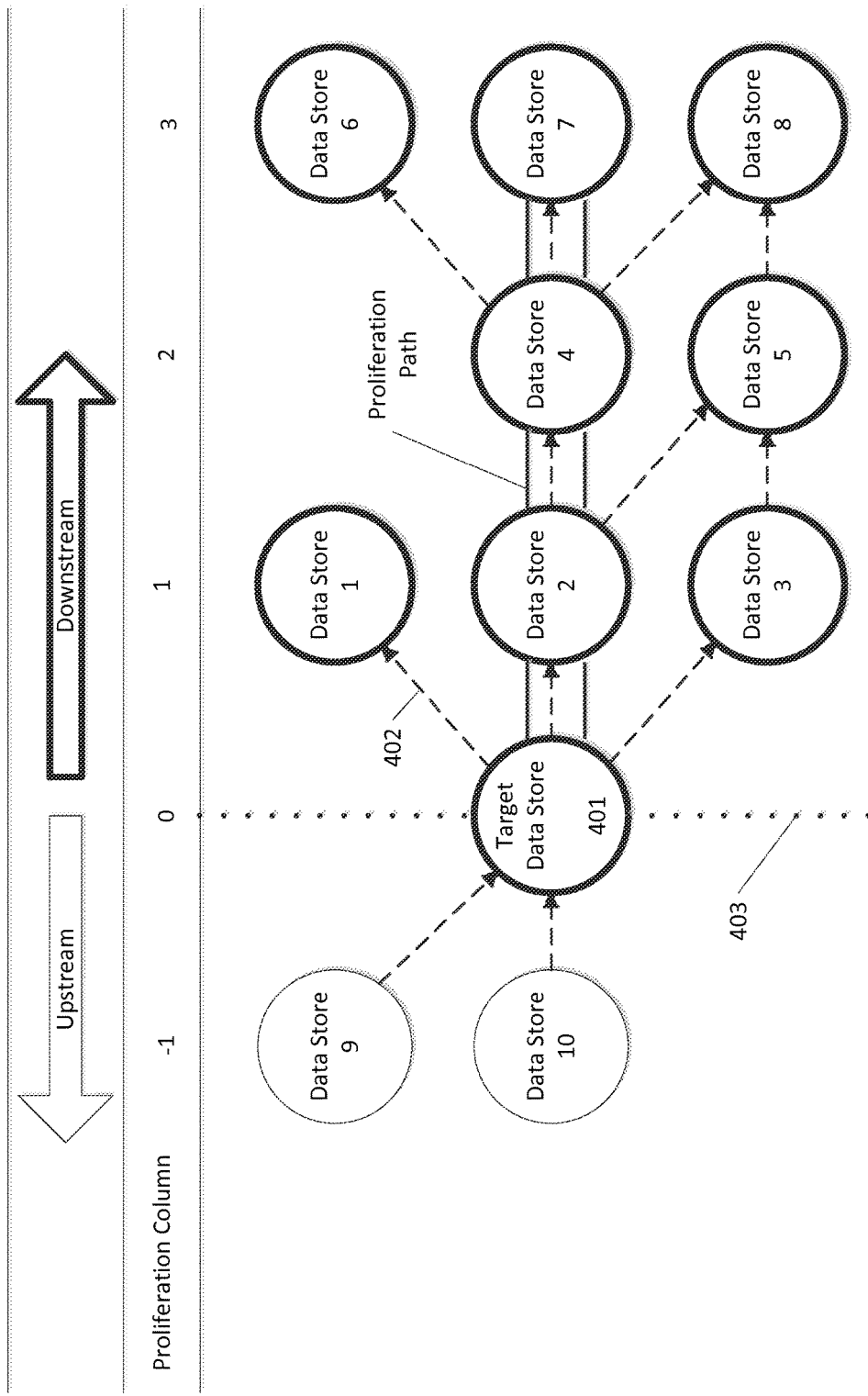
FIGS. 4A-4F illustrate various features of data proliferation graphs according to an exemplary embodiment.

An example of a data proliferation graph in which a user has selected a downstream route is shown in FIG. 4A. The data proliferation graph of FIG. 4A corresponds to the data in table 301 of FIG. 3. The user's selection of downstream is indicated by the darkened downstream arrow near the top of the figure. Of course, the indicators for upstream or downstream can be represented in other ways, such as buttons, drop-down menus, or other user interface elements. As shown in FIG. 4A, the data proliferation graph includes a target node 401 corresponding to the target data store, which is in a target proliferation column, indicated by the numeral zero and dotted line 403.

The data proliferation graph of FIG. 4A also includes proliferation path (showing a downstream route), indicated by the parallel darkened lines, and a plurality of proliferation nodes corresponding to data stores in the proliferation path (the target data store, data store 2, data store 4, and data store 7), and the immediate children of the data stores in the proliferation path (data stores 1-3, data stores 4-5, and data stores 6-8).

The parent-child relationships between the data stores are shown as dashed arrows, such as arrow 402, from parent to child (where a data store is a child data store of a parent data store if it has received data from that data store). In this example, data stores 1, 2, and 3 are immediate children of the target data store (meaning they received data from the target data store), data stores 4 and 5 are immediate children of data store 2, and data stores 6, 7 and 8 are immediate children of data store 4. Therefore, the plurality of proliferation nodes include proliferation nodes corresponding to the target data store and data stores 1-8.

The plurality of proliferation nodes are in a plurality of proliferation columns corresponding to the proliferation levels. For example, the proliferation nodes corresponding to data stores 4 and 5 are in proliferation column 2.

Also shown in FIG. 4A are nodes corresponding to the upstream data stores, data store 9 and data store 10. These nodes would not be included the proliferation nodes (as the user has not selected upstream) but they are shown in the figure for purposes of explanation. As indicated in the figure, data stores 9 and 10 are both immediate parents of the target data store (meaning the target data store received data from each of them). FIG. 4A represents all of the proliferation nodes with darkened circles, whereas the other nodes (such as those corresponding to data stores 9 and 10) as indicated with lighter circles.

Many of the features shown in the data proliferation graph of FIG. 4A would not necessarily need to be transmitted when the data proliferation graph or a portion of the data proliferation graph is transmitted for display, and are presented for the purpose of explanation.

Figure 4B:
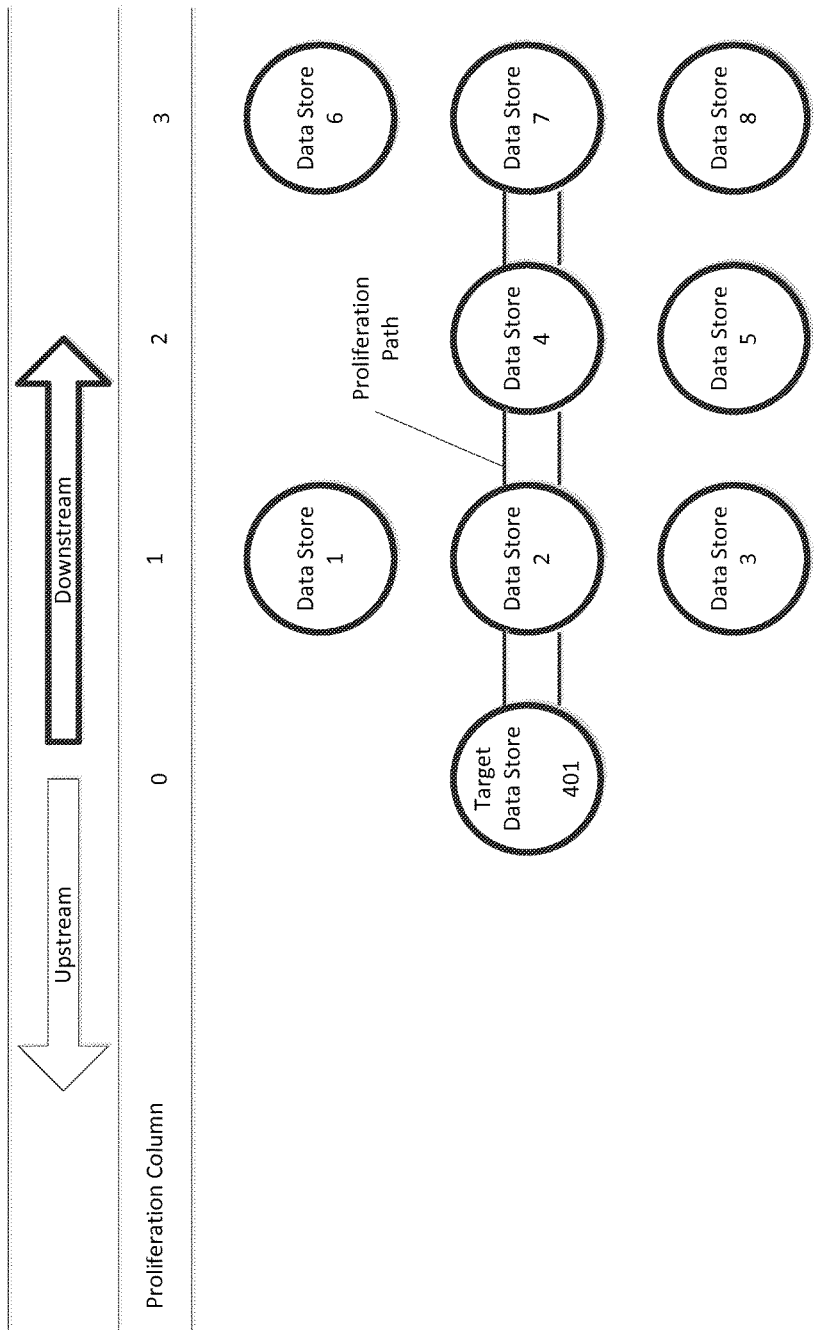

For example, FIG. 4B illustrates a data proliferation graph which corresponds to the same underlying data as FIG. 4A but with a simplified interface. In FIG. 4B, the parent-child relationships between the data stores still inform the layout and presentation of the nodes, but are not explicitly displayed with dashed arrows. Additionally, since the user has selected the downstream arrow, the nodes corresponding to data stores 9 and 10, which are immediate parents of the target data store, are not included in the plurality of proliferation nodes and are not displayed in the figure. As shown in FIG. 4B, the plurality of data stores can include a plurality of downstream data stores which have received data that was previously on the target data store, the plurality of proliferation levels can include a plurality of downstream levels corresponding to degrees of separation downstream from the target data store, and the plurality of proliferation nodes can correspond to data stores in the proliferation path and all immediate children of the data stores in the proliferation path.

FIG. 4B still indicates the proliferation path using darkened parallel lines. As indicated in the figure, the proliferation path includes one proliferation node in each of the plurality of proliferation columns. Of course, the proliferation path can be represented using a variety of techniques. For example, the proliferation path can implicitly be the center row in the data proliferation graph, or the proliferation path can be indicated by highlighting or otherwise visually marking each of the proliferation nodes in the proliferation path.

Figure 4C:
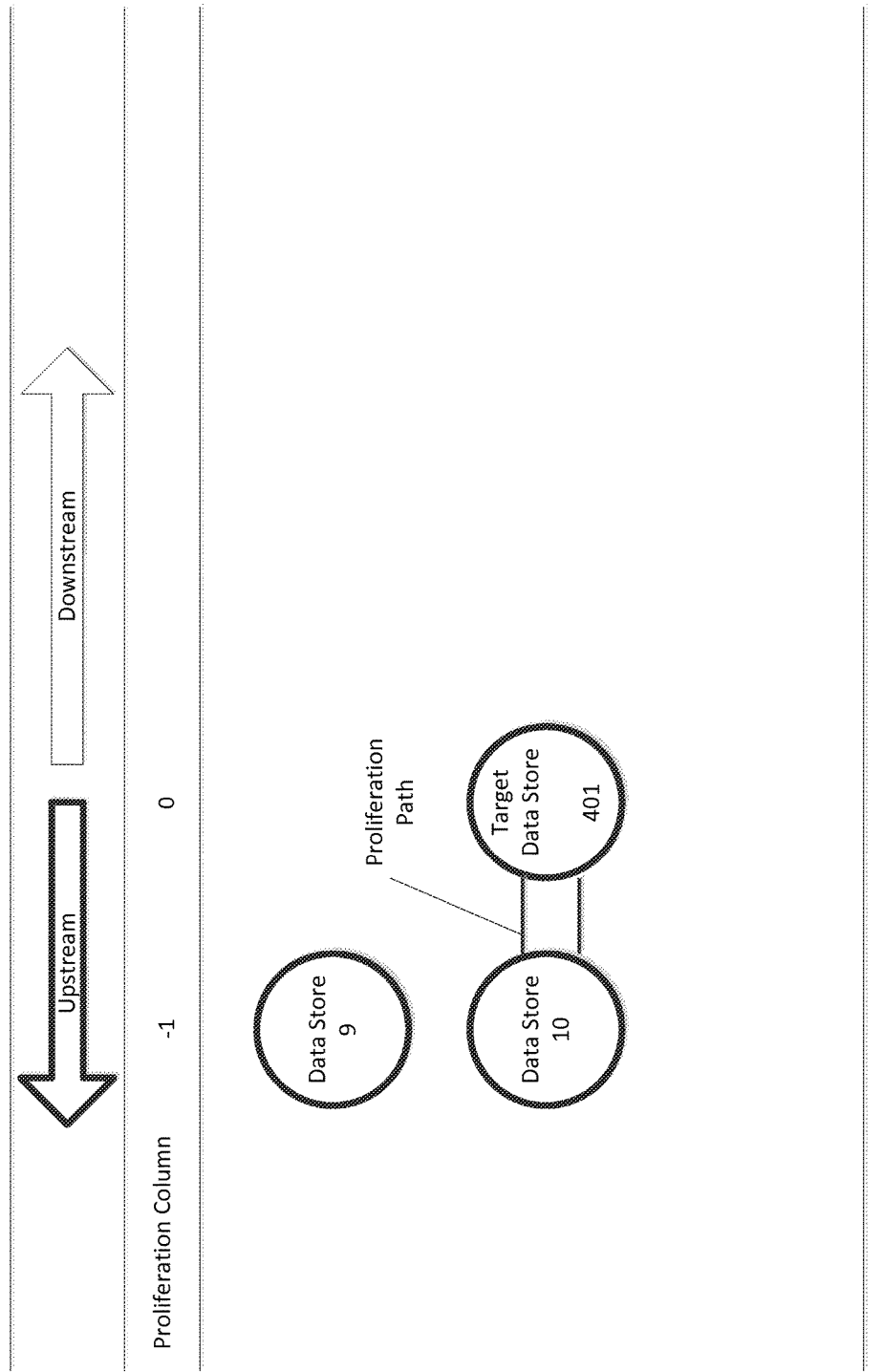

FIG. 4C illustrates a data proliferation graph in which a user has selected the upstream arrow. As a result, the data proliferation graph includes proliferation path (showing an upstream route), indicated by the parallel darkened lines, and a plurality of proliferation nodes corresponding to data stores in the proliferation path (the target data store and data store 10) and the immediate parents of the data stores in the proliferation path (data stores 9-10, which are immediate parents of the target data store). As shown in FIG. 4C, the plurality of data stores can include a plurality of upstream data stores which have received data that was previously on the target data store, the plurality of proliferation levels can include a plurality of upstream levels corresponding to degrees of separation upstream from the target data store, and the plurality of proliferation nodes can correspond to data stores in the proliferation path and all immediate parents of the data stores in the proliferation path.

Figure 4D:
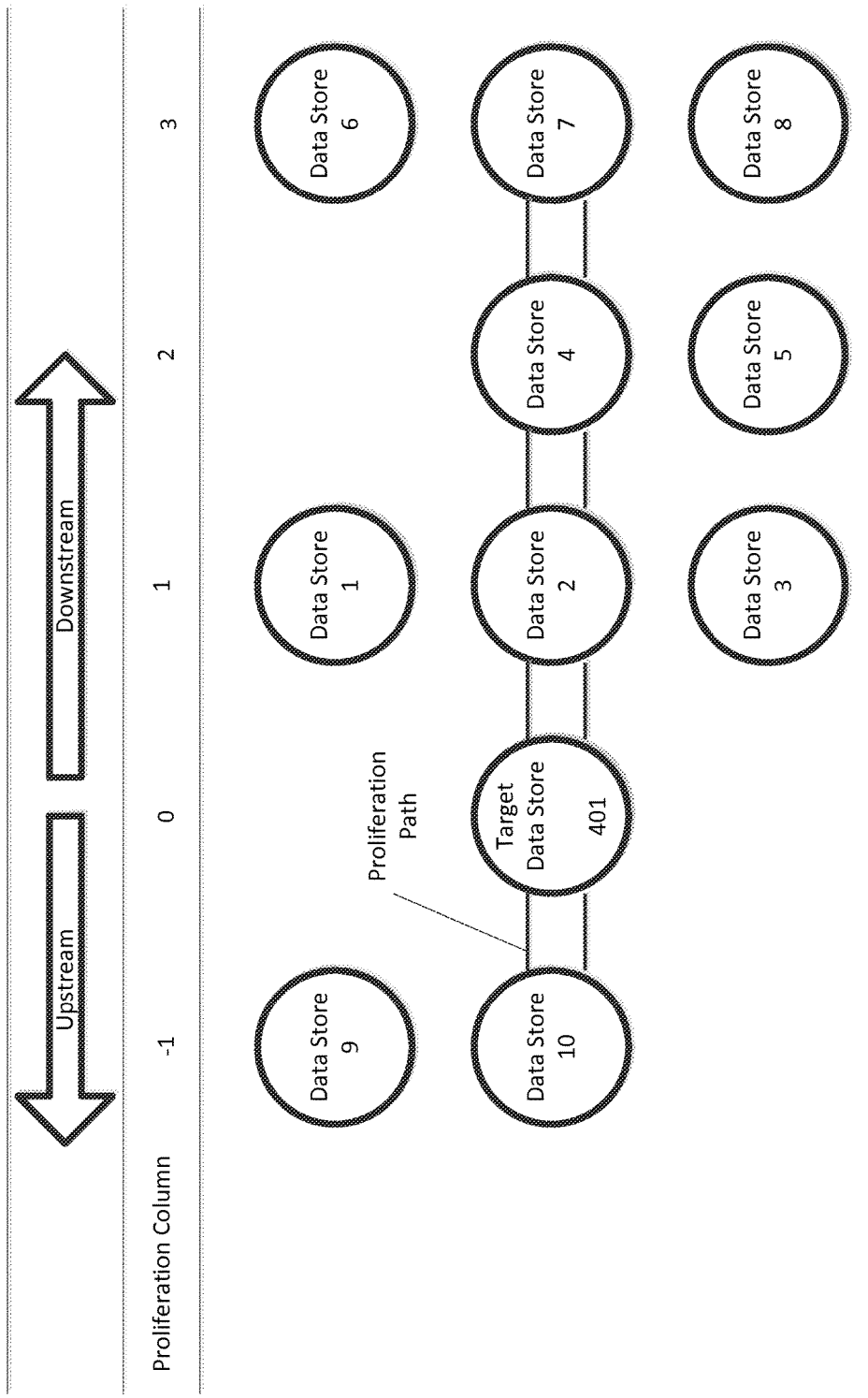

FIG. 4D illustrates a data proliferation graph in which a user has selected both the downstream arrow and the upstream arrow. As a result, the data proliferation graph includes a proliferation path (showing a downstream route and an upstream route), indicated by the parallel darkened lines and a plurality of proliferation nodes corresponding to data stores in the proliferation path (data store 10, the target data store, data store 2, data store 4, and data store 7), the immediate children of the data stores in the proliferation path for a downstream route (data stores 1-3, data stores 4-5, and data stores 6-8), and the immediate parents of the data stores in the proliferation path for an upstream route (data stores 9 -10, which are immediate parents of the target data store).

Figure 4E:
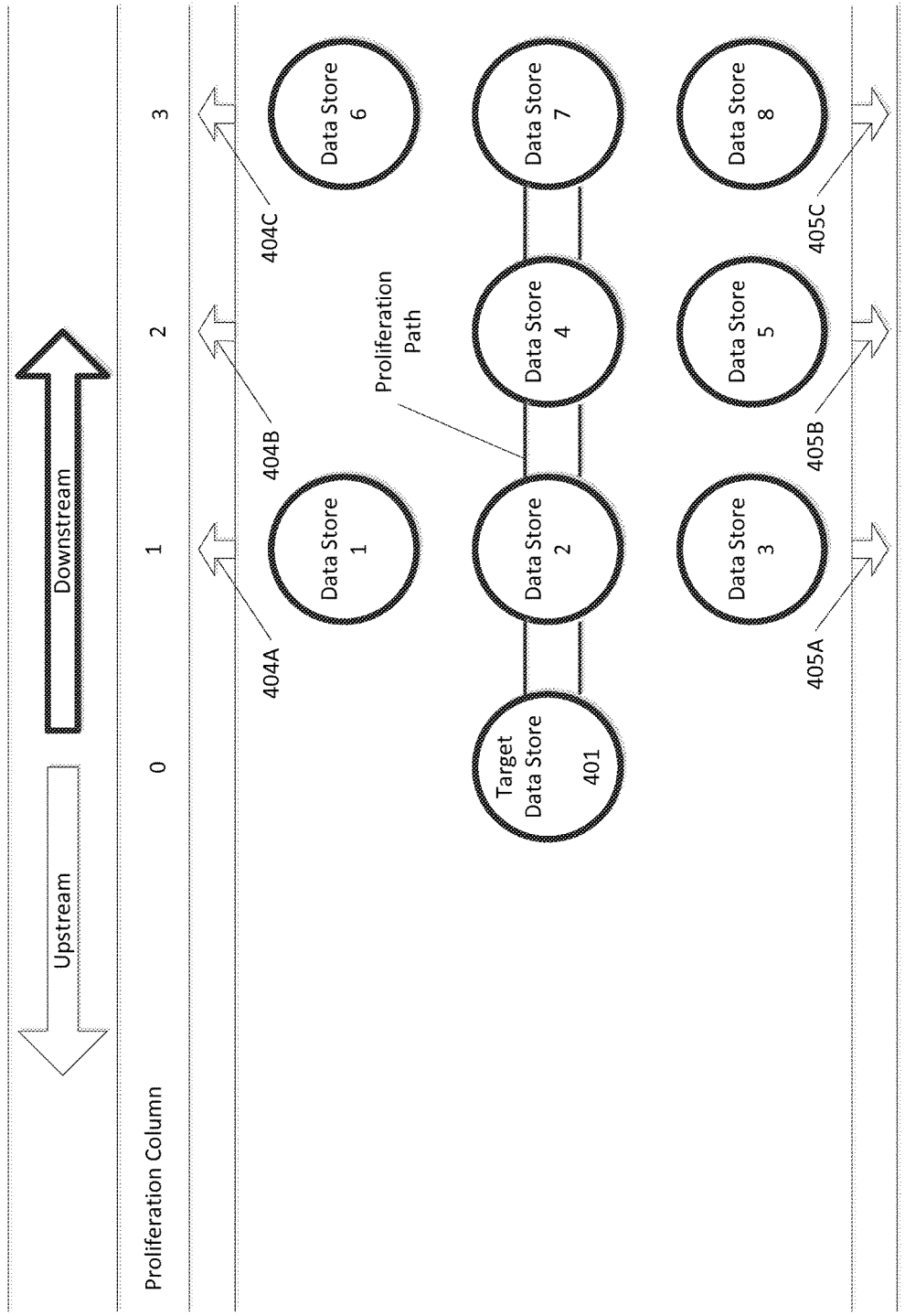

FIG. 4E illustrates an interface with a data proliferation graph that is similar to that of FIG. 4B. In addition, the interface of FIG. 4E includes a plurality of up arrows corresponding to the plurality of proliferation columns and a plurality of down arrows corresponding to the plurality of proliferation columns. For example, arrows 404A and 405A correspond to proliferation column 1, arrows 404B and 405B correspond to proliferation column 2, and arrows 404C and 405C correspond to proliferation column 3.

The up arrows and down arrows can be used to adjust which proliferation node in each of the proliferation columns of the data proliferation graph is in the proliferation path. Of course, different indicators or methods can be used other than the up arrows and down arrows to adjust the proliferation path. For example, a user can drag one of the proliferation nodes in a column into the proliferation path using a pointing device or their finger (if implemented on a touchscreen device).

Of course, when the proliferation path is adjusted, it will result in an adjustment of which data stores are within the proliferation path, which data stores are immediate children of data stores within the proliferation path (for a downstream route), and which data stores are immediate parents of data stores within the proliferation path (for an upstream route). The means that when the proliferation path is adjusted, a new set of proliferation nodes must be determined.

Figure 4F:
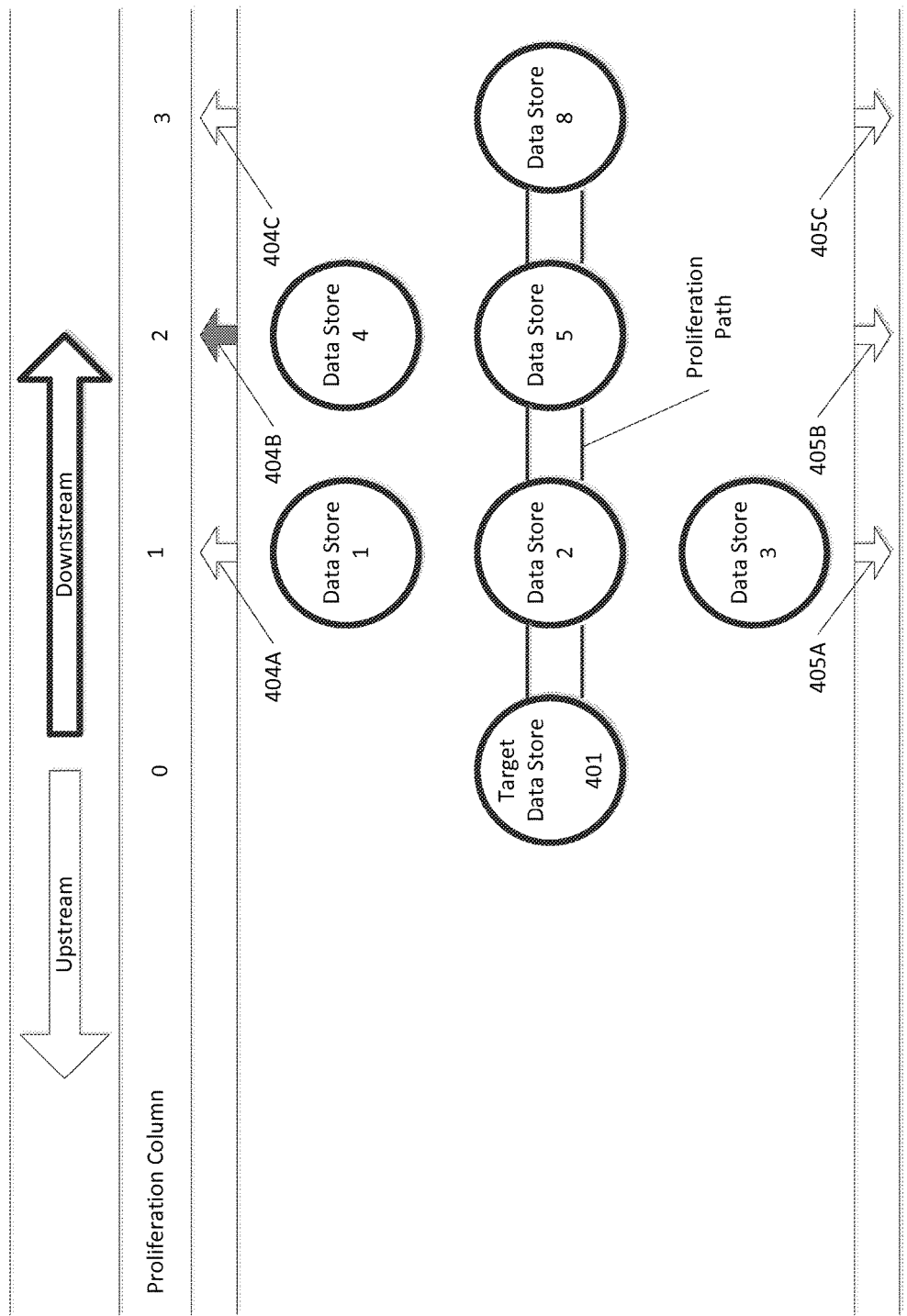

For example, FIG. 4F illustrates a data proliferation graph that results when a user clicks on up arrow 404B in proliferation column 2. By clicking the up arrow in that proliferation column, the proliferation node corresponding to data store 5 is brought into the proliferation path and the proliferation node corresponding to data store 4 is moved out of the proliferation path. As shown in FIG. 4A, data store 5 only has one immediate child data store, data store 8. Therefore, as shown in FIG. 4F, data store 8 would be the default proliferation node in the proliferation path for proliferation column 3. As discussed earlier, rather than clicking the up arrow, a user can also drag the proliferation node corresponding to data store 5 upwards into the proliferation path, moving the proliferation node corresponding to data store 4 out of the proliferation path.

Figures 5A, 5B, 5C:
FIGS. 5A-5H illustrate different techniques for representing data store characteristics in proliferation nodes according to an exemplary embodiment.

The proliferation nodes within each proliferation column of a data proliferation graph can be sorted within that proliferation column based at least in part on a ranking criteria associated with that proliferation column. FIG. 5A illustrates a sample data table 501 corresponding to three data stores and corresponding characteristics of the three data stores, including data volume (a size of the data store), a risk score (corresponding, for example, to a security risk associated with a data store), and a number of jumps for each data store (indicating the number of data stores downstream of the particular data store for a downstream route of data and the number of data stores upstream of the particular data store for an upstream route of data). The data in table 501 in FIG. 5A will be the basis for the various sorting and visualization schemes described in FIGS. 5B-5F.

FIG. 5B illustrates a sample sorted proliferation column 503 of a data proliferation graph. As shown in FIG. 5B, the ranking criteria 502 for the column can be indicated above the column and the sort order can be structured such that, in a given column, the objects are distributed from the center going out based on their ranking obtained for the ranking criteria. For example, the proliferation node that is ranked number 1 based on the ranking criteria 502 can be positioned in the middle of the proliferation column 503, the proliferation node that is ranked number 2 can be one above the middle, the proliferation node that is ranked number 3 can be one below, and so on. This type of sorting enables the user to quickly visualize the most important or highest ranked proliferation node, as it is centralized in the middle of the proliferation graph. Of course, other sorting order are also possible, such as lowest-to-highest or highest-to-lowest.

FIG. 5C illustrates the sorting order of FIG. 5B applied to the data in the table of FIG. 5A with a ranking criteria of data volume 504. As shown in FIG. 5C, since data store 2 is the data with the largest data volume, the proliferation node corresponding to data store 2 is in the center of the proliferation column 505. Additionally, as data store 1 has the next largest data volume, the proliferation node corresponding to that data store is one above the center of the proliferation column 505 and since data store 3 has the smallest data volume, the proliferation node corresponding to that data store is one below the center of the proliferation column 505.

Figure 5D:
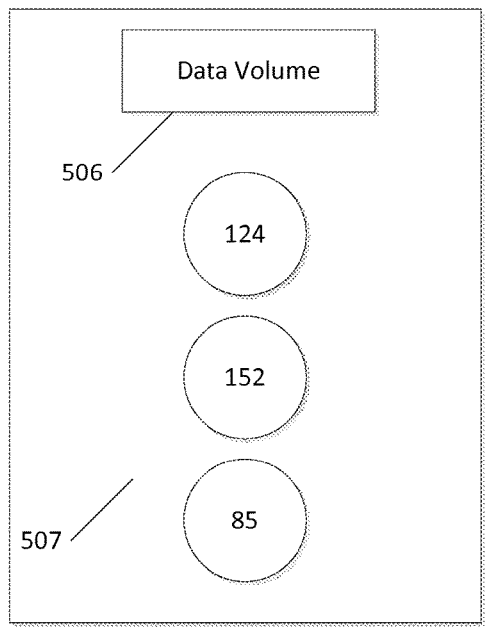

FIG. 5D is similar to the sorted proliferation column of FIG. 5C, except that each of the proliferation nodes in the proliferation column 507 of FIG. 5D list the data volume of the data store for corresponding to that proliferation node. As FIG. 5D is also sorted using a ranking criteria of data volume 506, the proliferation node corresponding to data store 2 is still in the center of the proliferation column. However, the text within the proliferation node reflects the data volume (152) of the underlying data store (data store 2). Similarly, the text within the proliferation node for data store 1 reflects the data volume of that data store (124) and the text within the proliferation node for data store 3 reflects the data volume of that data store (85).

Figure 5E:
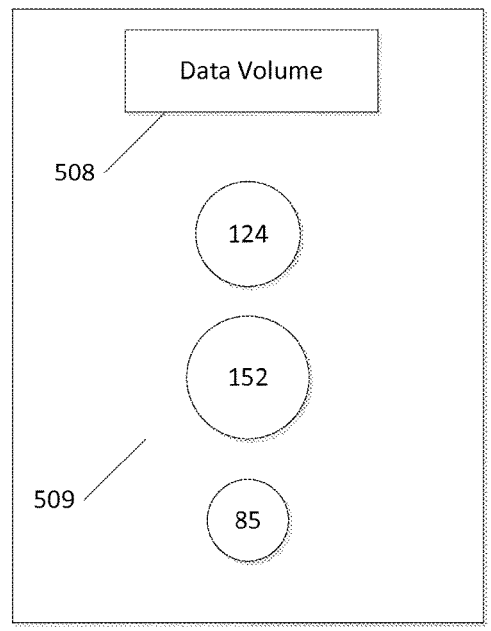

FIG. 5E is similar to FIG. 5D in that the sorted proliferation column 509 of that figure is also sorted by a ranking criteria of data volume 508 and that each of the proliferation nodes within the sorted proliferation column include the value of the data volume of the underlying data store. However, as shown in FIG. 5E, the size of each of the proliferation nodes within the proliferation column is used to reflect the size of the corresponding data volume. For example, the size of the proliferation node corresponding to a data volume of 152 (which is for data store 2) is larger than the size of the proliferation node corresponding to a data volume of 124 (which is for data store 1), which itself is larger than the size of the proliferation node corresponding to a data volume of 85 (which is for data store 3). Of course, the relative differences between the proliferation nodes for a particular ranking criteria can also be indicated using visual indicators other than size, such as color, intensity, shading, shape, etc.

Figure 5F:
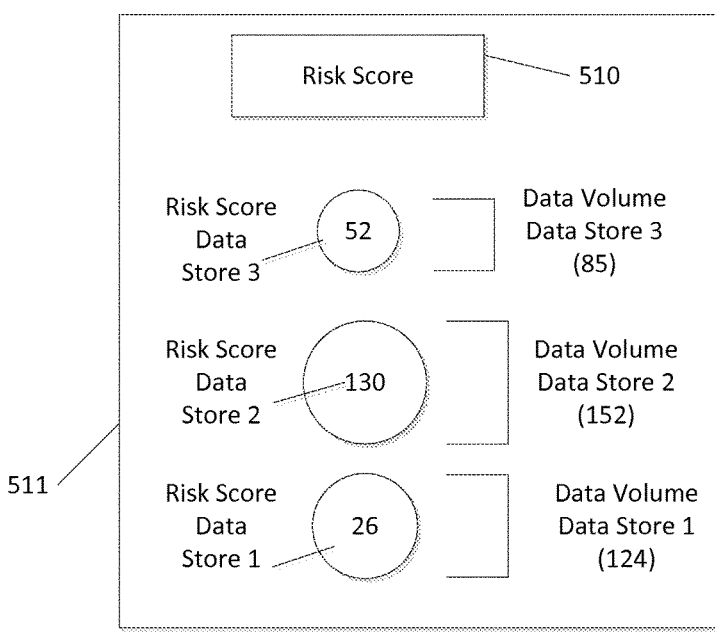

FIG. 5F illustrates a proliferation column 511 in which the proliferation nodes corresponding to the data stores in table 501 have been sorted according to a ranking criteria of risk score 510 and which display their respective risk scores. As data store 2 has the highest risk score (130), the proliferation node for that data store is in the center of the column 511. Additionally, as data store 3 has the second highest risk score (52), the proliferation node for that data store is one above the center of the column 511. Furthermore, as data store 1 has the third highest risk score (26), the proliferation node for that data store is one below the center of the column 511.

In additional to visually displaying the risk scores corresponding to their underlying data stores, the proliferation nodes in FIG. 5F also display the data volumes corresponding to each of the underlying data stores. The data volumes are displayed by making the size of each of the proliferation nodes correspond to the data volume of each underlying data store. Of course, the sizes of the proliferation nodes do not need to be strictly proportional to the respective data volumes, but can be used to indicate relative data volumes. By representing information in this way, multiple different characteristics of a particular data store can be reflected in the proliferation node for that data store. This allows for differences between the data stores to be easily ascertained. For example, a user looking at the proliferation column in FIG. 5F can easily ascertain that although data store 3 has a greater risk score than data store 1, data store 1 has a larger data volume than data store 3 (based on the size of the respective proliferation nodes). Of course, the relative differences between the proliferation nodes for any particular characteristic can also be indicated using visual indicators other than size, such as color, intensity, shading, shape, etc.

Figure 5G:
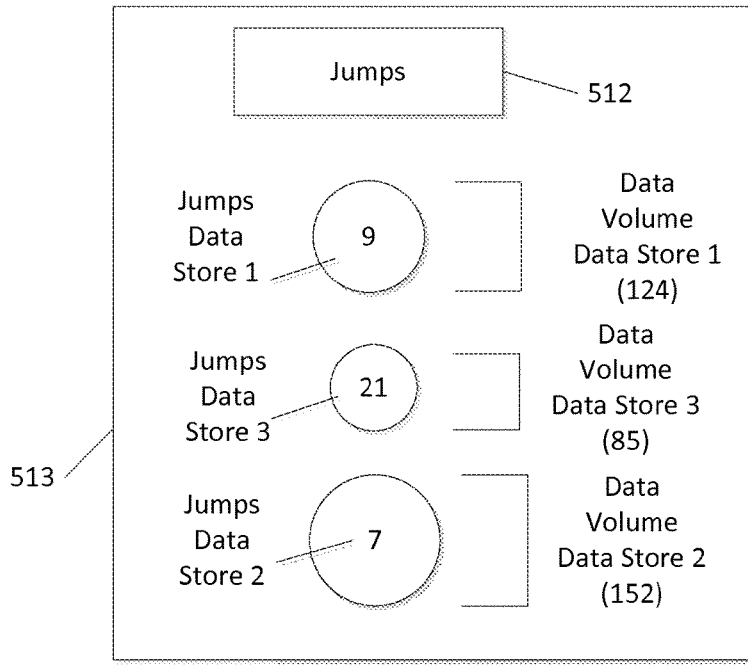

FIG. 5G illustrates a proliferation column 513 sorted by a ranking criteria of jumps 512, where each of the proliferation nodes in the proliferation column 513 indicate the number of jumps for the underlying data store. As data store 3 has the greatest number of jumps (21), it is ranked first and is in the center of the column 513. Data store 1 has the second largest number of jumps (9) and is one above the center while data store 2 has the fewest jumps (7) and is one below the center. Similar to FIG. 5F, the size of each of the proliferation nodes reflects the data volume of each of the underlying data stores.

Figure 5H:
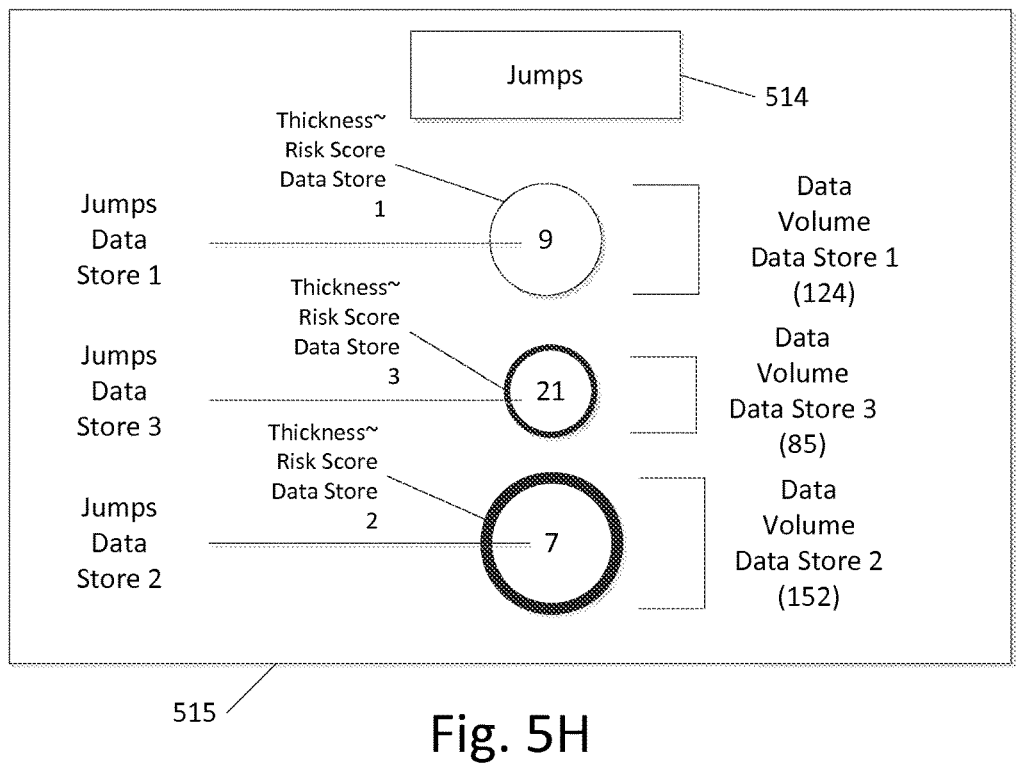

FIG. 5H is similar to FIG. 5G, in that the proliferation column 515 of FIG. 5H is also sorted by the ranking criteria of jumps 514. However, FIG. 5G also represents the relative risk scores corresponding to the three data stores using the thickness of the outer circumference of each of the proliferation nodes. For example, data store 2 has the highest risk score so the proliferation node corresponding to that data store has the thickest outer circumference. The visual indicators used to represent data store characteristics in FIGS. 5A-5H are only some of the possible visual indicators that can be utilized. For example, the color, shape, texture and/or size of the proliferation nodes or symbols within the proliferation nodes can also be used to reflect characteristics of the underlying data stores. Additionally, the visual indicators can be tied to characteristics in a variety of ways. For example, the size of a node can reflect a risk score of a corresponding data store.

Figure 6:
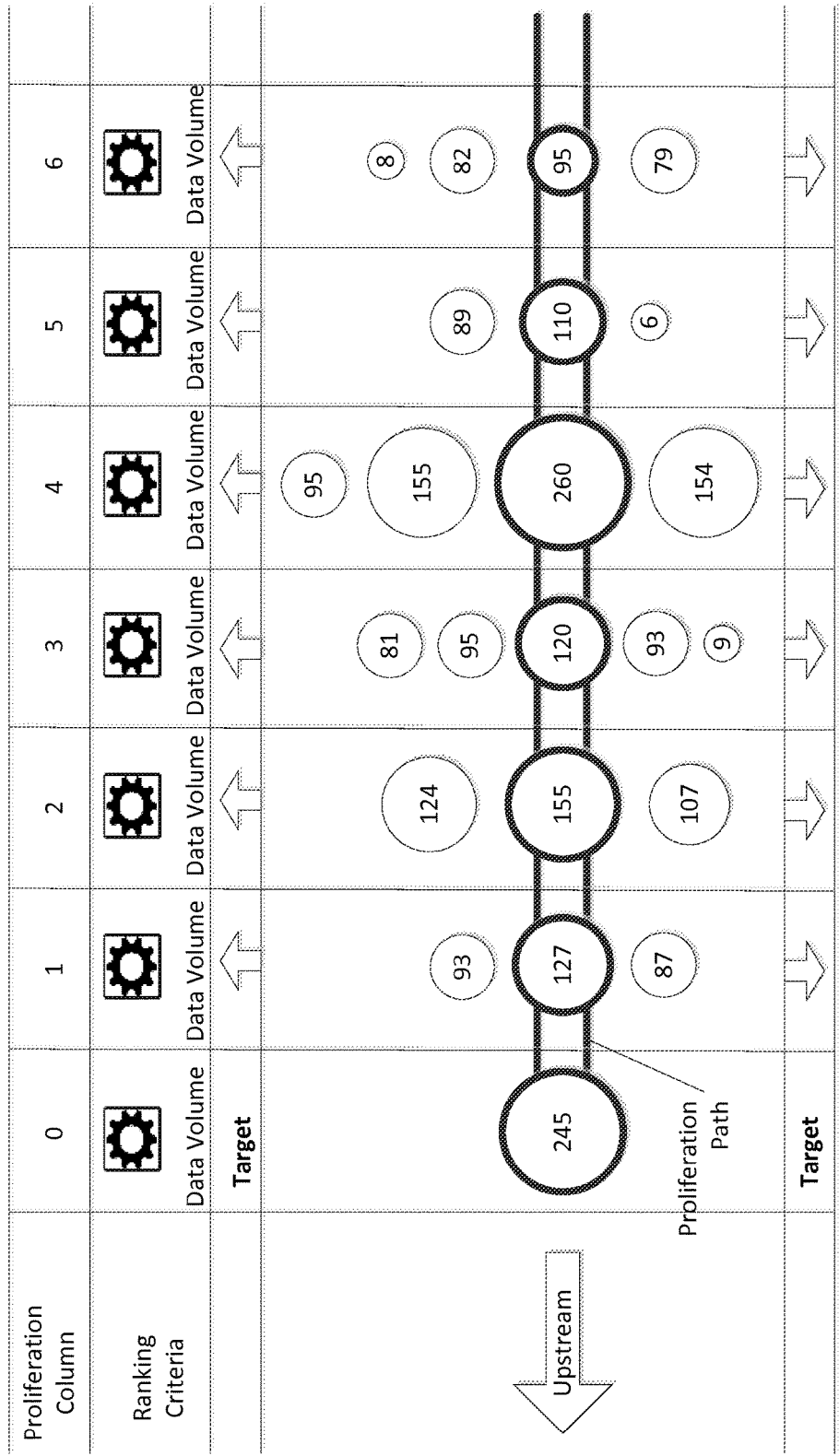
FIGS. 6-7 illustrate additional features of an interface for transmitting a portion of a data proliferation graph according to an exemplary embodiment.

FIG. 6 shows an example interface showing a portion of a data proliferation graph which incorporates many of the features described in FIGS. 4A-4F and FIGS. 5A-5H. In this case, the proliferation nodes shown in FIG. 6 are similar to those of FIG. 5E, where the size of the data volume of the underlying data store determines the size of each proliferation node and where the actual data volume is indicated within the proliferation node.

As shown in FIG. 6, the data proliferation graph includes plurality of proliferation columns corresponding to different proliferation levels. For the purpose of explanation, only downstream proliferation columns are shown, but the data proliferation graph portion can also include upstream proliferation columns.

Each proliferation column shown in FIG. 6 includes a corresponding ranking criteria indicator, shown by the gear symbol above each column. In this case, the ranking criteria indicator is set to "data volume" for each of the proliferation columns, but the ranking criteria can be any sortable characteristic of the underlying data stores, such as risk scores, jumps, number of users, number of departments, and/or data volume. A user can select or modify the ranking criteria for a particular proliferation column by selecting a ranking criteria icon (the gear in FIG. 6) associated with that proliferation column. Additionally, the ranking criteria for each proliferation can be set to "data volume" or to some other characteristic by default when the data proliferation graph is generated. This default ranking criteria can also be set by a user.

As shown in FIG. 6, each proliferation column in the plurality of proliferation columns is sorted such that a top ranked proliferation node for that proliferation column is a center proliferation node of the proliferation column. For example, the top ranked proliferation node in proliferation column 4 is the proliferation node corresponding to a data volume of 260. FIG. 6 also shows a proliferation path which includes the center proliferation node in each of the proliferation columns shown in the figure. As each of the proliferation columns are sorted so that the top ranked proliferation node is in the center of the corresponding proliferation column, the proliferation path in this case includes the top ranked proliferation node in each of the proliferation columns. However, any of the schemes and features described in FIGS. 5A-5H can be used as well.

Each of the proliferation columns in FIG. 6 also includes up arrows and down arrows. These up arrows and down arrows can allow users to scroll up and down to view additional proliferation nodes within a particular column if they are not able to fit within the visible portion of the proliferation column shown in the interface of FIG. 6. Alternatively, the up and down arrows can be used to rotate the entire column up and down so as to move a different proliferation node into the proliferation path for that column.

Figure 7:
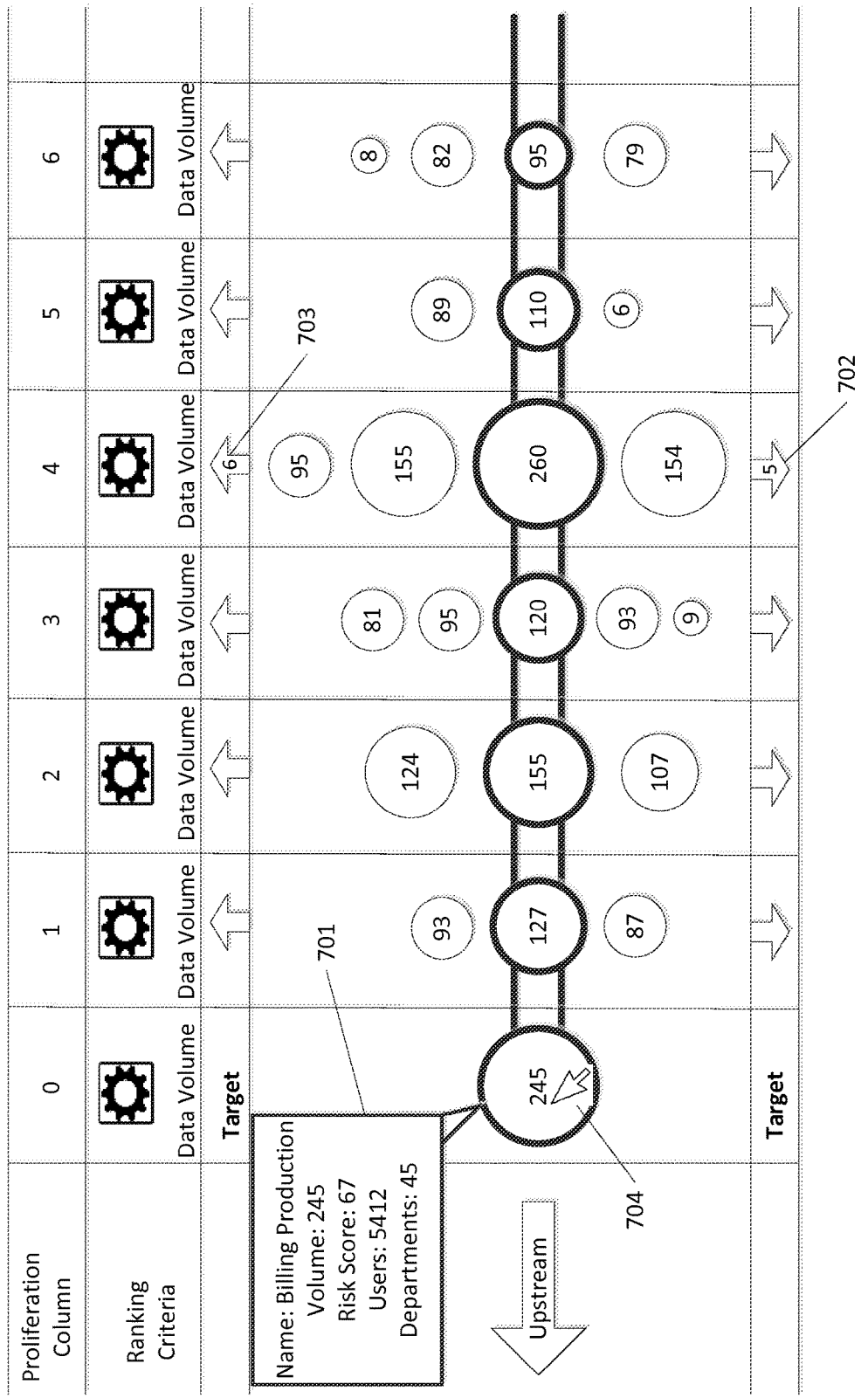

FIG. 7 illustrates some additional features of the interface which displays the data proliferation graph. A user can display additional information about a data store corresponding to a particular proliferation node by selecting the proliferation node in the interface (such as by moving a pointer over it, clicking on it, or tapping it on a touchscreen device). As shown in FIG. 7, the user has selected the target node by moving the mouse pointer 704 over it. In response to the selection of the target node by the user, pop-up window 701 appears and includes details about the target data store, such as the data volume, the risk score, the number of users of the target data volume, and the number of departments that use the data volume or which store data on the data volume. A user can select any one of the proliferation nodes in the data proliferation graph and a pop-up window would provide similar information.

In the event that the number of proliferation nodes within a particular column do not all fit within the allocated space within the interface, one or more indicators can also be used to tell the user how many additional proliferation nodes are within a particular column. For example, the up arrow in proliferation column 4 of FIG. 7 includes an indicator 703 of the number of proliferation nodes that are above the top-most shown proliferation node in that column. As shown by the indicator 703, there are six additional proliferation nodes above the top-most proliferation node in proliferation column 4. Similarly, indicator 702 shows the number of proliferation nodes that are below the bottom-most shown proliferation node in column 4. As shown by indicator 702, there are five proliferation nodes below the bottom-most shown proliferation node in that proliferation column. A user could scroll up or down to these hidden proliferation nodes by using the up or down arrows, by dragging the proliferation columns up or down using a pointing device or touch gesture, or by entering some keyboard command.

As discussed earlier, the entire data proliferation graph can be transmitted within the interface if the data proliferation graph is small enough to fit within the interface. When large data sets and large numbers of data volumes are involved, this will most likely not be the case. In these situations, at least one portion of the data proliferation graph can be transmitted for display.

Transmitting at least one portion of the data proliferation graph can include transmitting the target column including the target node, transmitting at least a portion of one or more proliferation columns in the plurality of proliferation columns, and transmitting an indication of at least a portion of a proliferation path.

Figure 8:
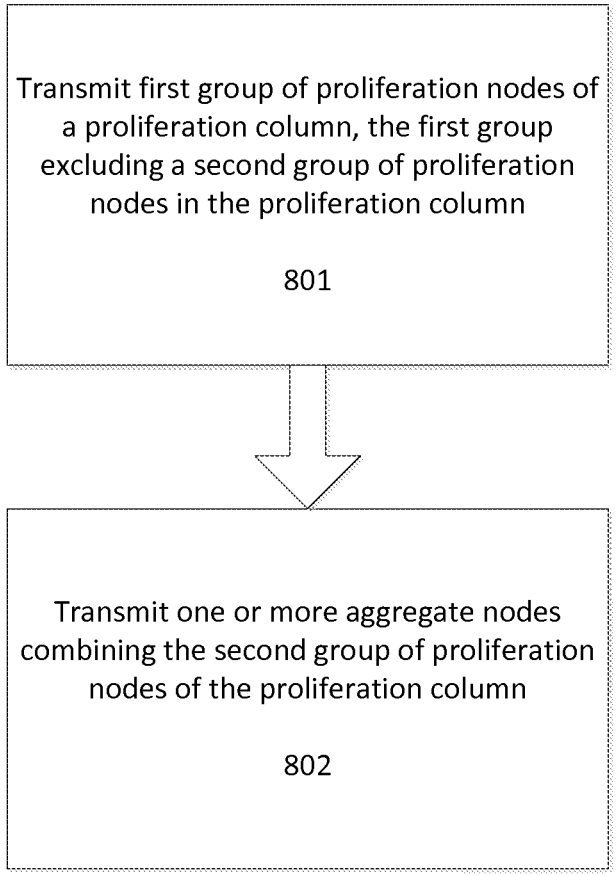
FIG. 8 illustrates a flowchart for transmitting aggregate nodes according to an exemplary embodiment.

When only a portion of a proliferation column is transmitted, the remaining portions (which are not transmitted) can be aggregated or otherwise combined and some indicator of the aggregate portions can also be displayed. FIG. 8 illustrates a flowchart for transmitting at least a portion of one or more proliferation columns according to exemplary embodiment.

For each proliferation column in the one or more proliferation columns, a first group of proliferation nodes of that proliferation column are transmitted at step 801. The first group of proliferation nodes can exclude a second group of proliferation nodes of the proliferation column. For example, if there is limited screen space, then the second group of proliferation nodes can correspond to proliferation nodes which do not fit on the screen. The first group of proliferation nodes can comprise a predetermined number of top ranked proliferation nodes in the proliferation column and the second group of proliferation nodes can comprise the remaining proliferation nodes in the proliferation column.

At step 802 one or more aggregate nodes combining the second group of proliferation nodes of the proliferation column are transmitted. For example, two aggregate nodes which combine the second group of proliferation nodes can be transmitted.

Figure 9:
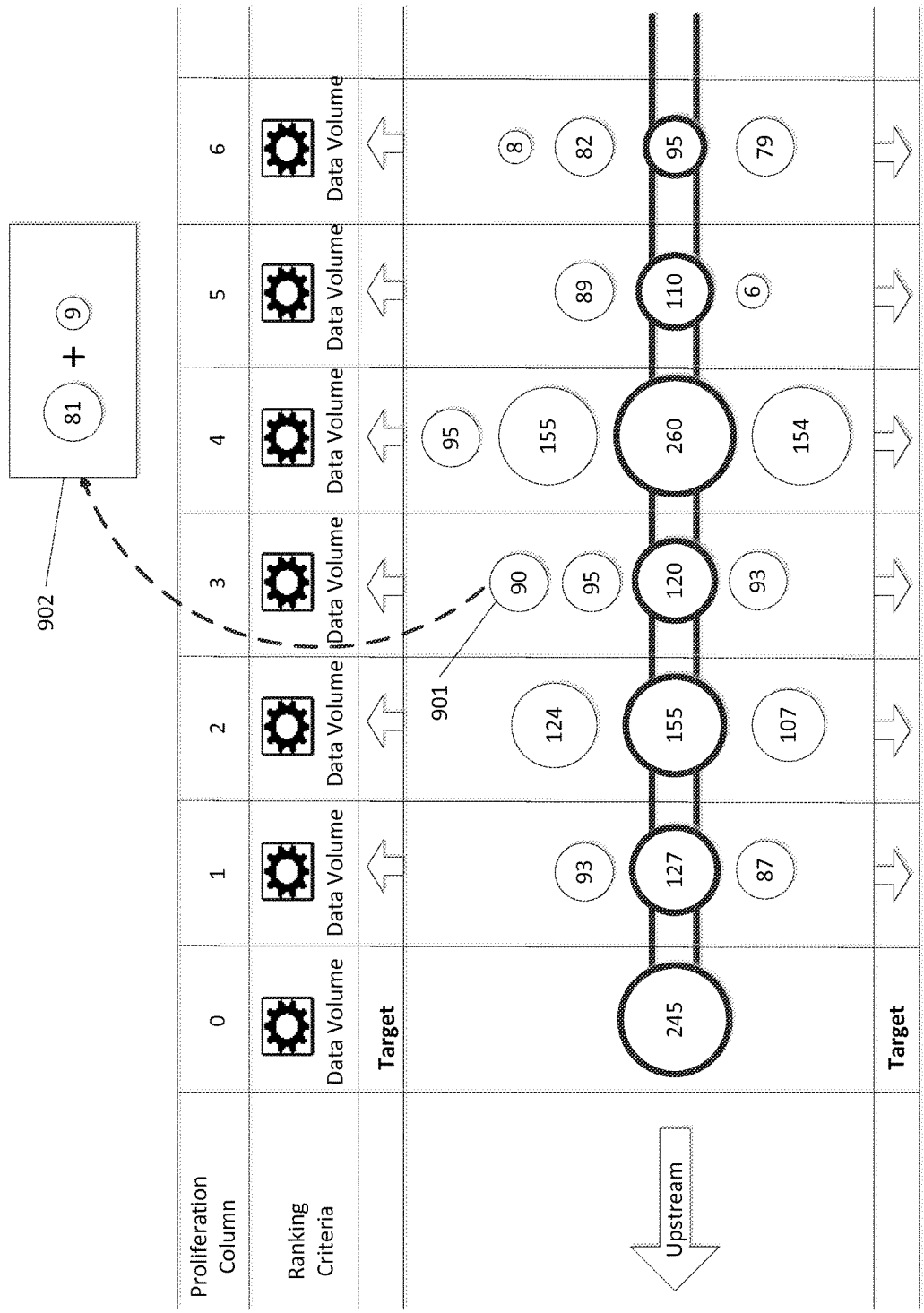
FIG. 9 illustrates an example of aggregating proliferation nodes according to an exemplary embodiment.

FIG. 9 illustrates an example of this aggregation technique in an interface including a data proliferation graph. The data proliferation graph of FIG. 9 is similar to that of FIG. 6. However, in the example of FIG. 9, a user has enabled an option (not shown) which filters the visual portion of the data proliferation graph such that no more than four proliferation nodes in each column are transmitted. As the only proliferation column in FIG. 6 which contains more than four proliferation nodes is proliferation column 3, the first three proliferation nodes of column 3 are transmitted as before, and the lowest ranking proliferation nodes (node 81 and node 9) are combined to display an aggregate node of 90. This node could be expanded by a user clicking on it or otherwise be marked to indicate that it is an aggregate node. Of course, aggregation can be applied in a variety of ways, and this example is not intended to be limiting. For example, aggregation of proliferation nodes can be determined on a column by column basis and can be based on the space available in each column, such that all proliferation nodes that do not fit with a certain column window (of a predetermined length) are aggregated.

Figure 10:
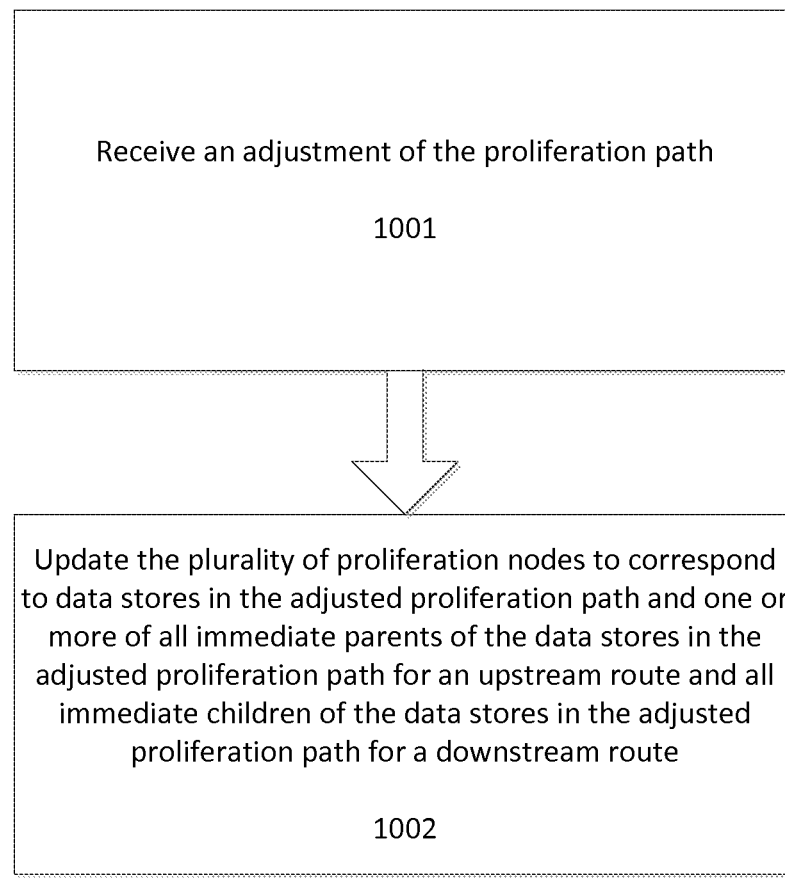
FIG. 10 illustrates a flowchart for updating proliferation nodes based on an adjustment of the proliferation path according to an exemplary embodiment.

FIG. 10 illustrates a flowchart for updating the data proliferation graph in response to receiving an adjustment of the proliferation path. At step 1001 an adjustment of the proliferation path is received. The adjustment can be received through selection of a proliferation node in a particular proliferation column for inclusion in the proliferation path that is not already in the proliferation path. This selection process was described with reference to FIGS. 4E-4F. As shown in those figures, the selection results in removal of a different proliferation node in the proliferation column from the proliferation path.

Alternatively, the adjustment can be received through selection of new ranking criteria for a proliferation column which results in re-sorting of that proliferation column and placement of a proliferation node in that proliferation column within the proliferation path that is not already in the proliferation path. For example, if a proliferation column is currently sorted according to a ranking criteria of data volume (with the highest data volume node in the middle of the column) and a user elects to re-sort it according to risk score, then the highest ranked proliferation node may be a different proliferation node. As a result, a different proliferation node may now be in the middle of the column. When the data proliferation graph configured such that the proliferation path always runs down the middle of the columns, then the proliferation path will have changed as a result of the re-sorting (assuming the same node in the column does not have the highest data volume and risk score).

Regardless of how the adjustment is received, at step 1002 the plurality of proliferation nodes are updated to correspond to data stores in the adjusted proliferation path and one or more of all immediate parents of the data stores in the adjusted proliferation path for an upstream route and all immediate children of the data stores in the adjusted proliferation path for a downstream route. As the proliferation node that has been placed into the proliferation path will necessarily have a different data lineage, the remaining proliferation nodes must be updated to reflect this lineage.

For example, as shown in FIG. 4F, when the node for data store 5 becomes part of the proliferation path, then the proliferation nodes for the next column must be updated to reflect the immediate children of data store 5 (since the proliferation path is a downstream route). In other words, each data store will likely have a different set of immediate children and parents than any other data stores within a column. Since the proliferation nodes include all immediate children (for a downstream route) or all immediate parents (for an upstream route) of every data store in the proliferation path, then a change of a data store in the proliferation path will have ripple effect on the remaining proliferation nodes and will require the downstream proliferation nodes to be updated (for a downstream route) and the upstream proliferation nodes to be updated (for an upstream route).

Figure 11A:
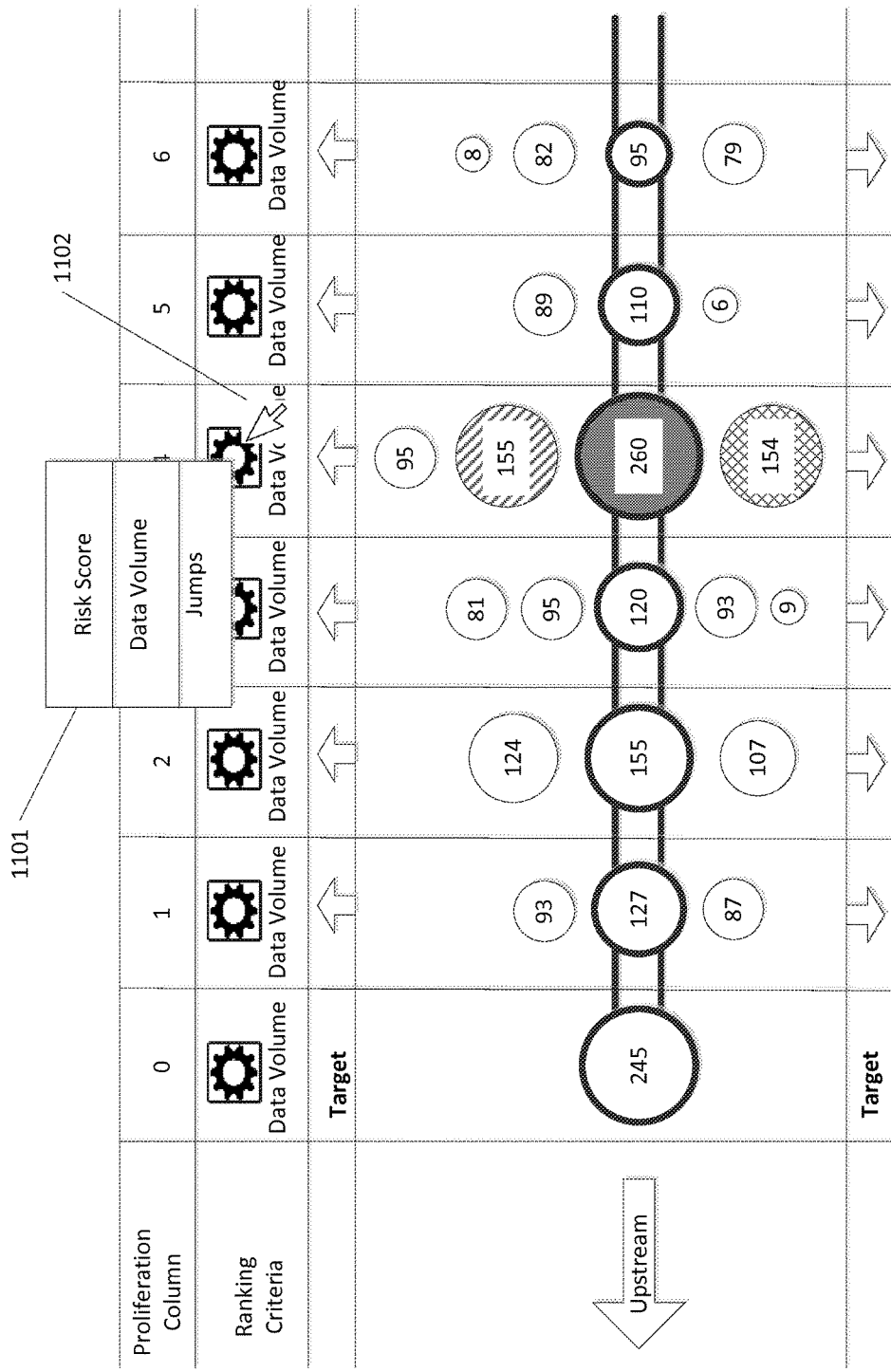
FIGS. 11A-11C illustrate an example of re-sorting one or more proliferation columns based on new ranking criteria and updating proliferation nodes according to an exemplary embodiment.
Figure 11B:
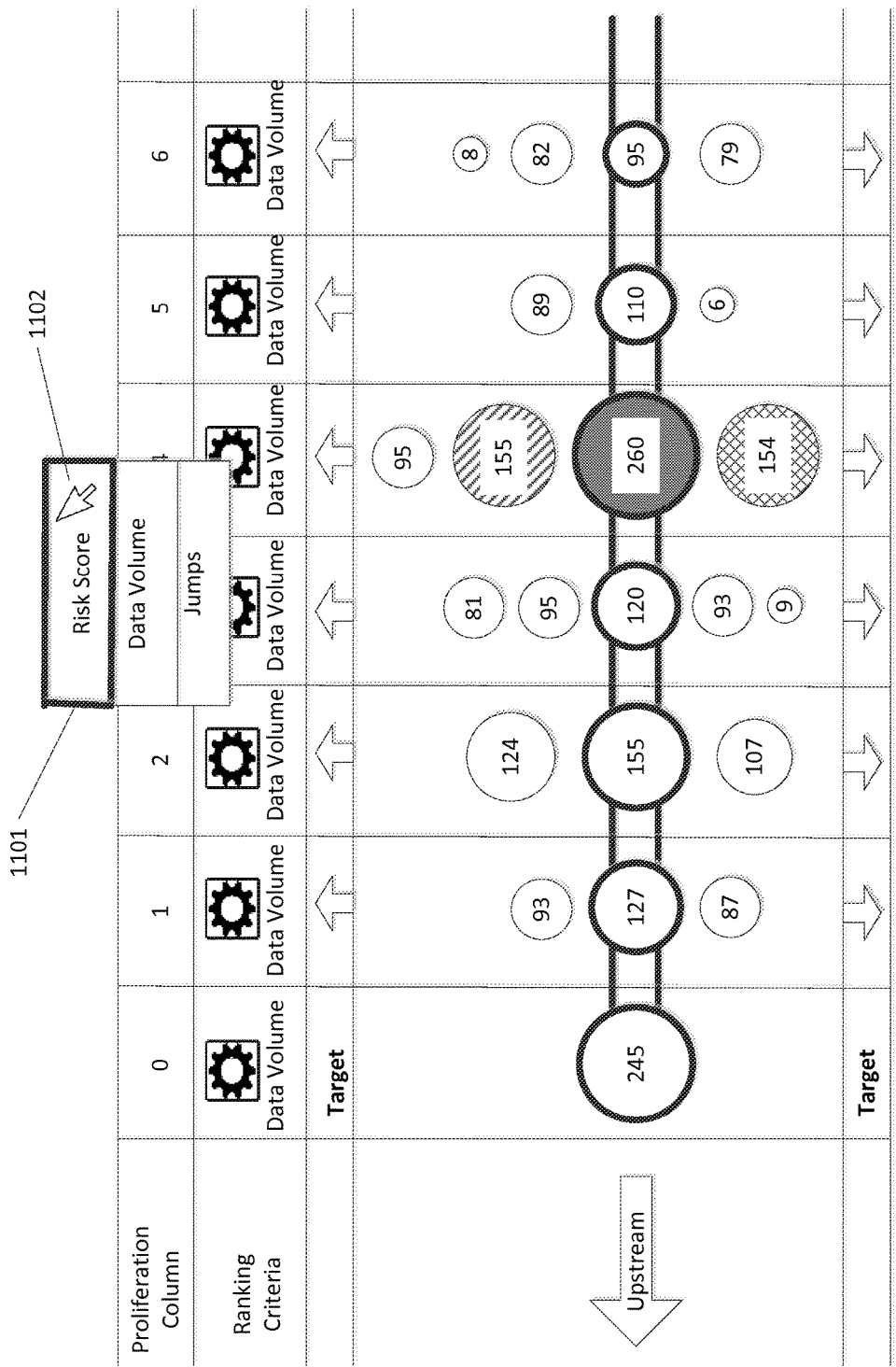
Figure 11C:
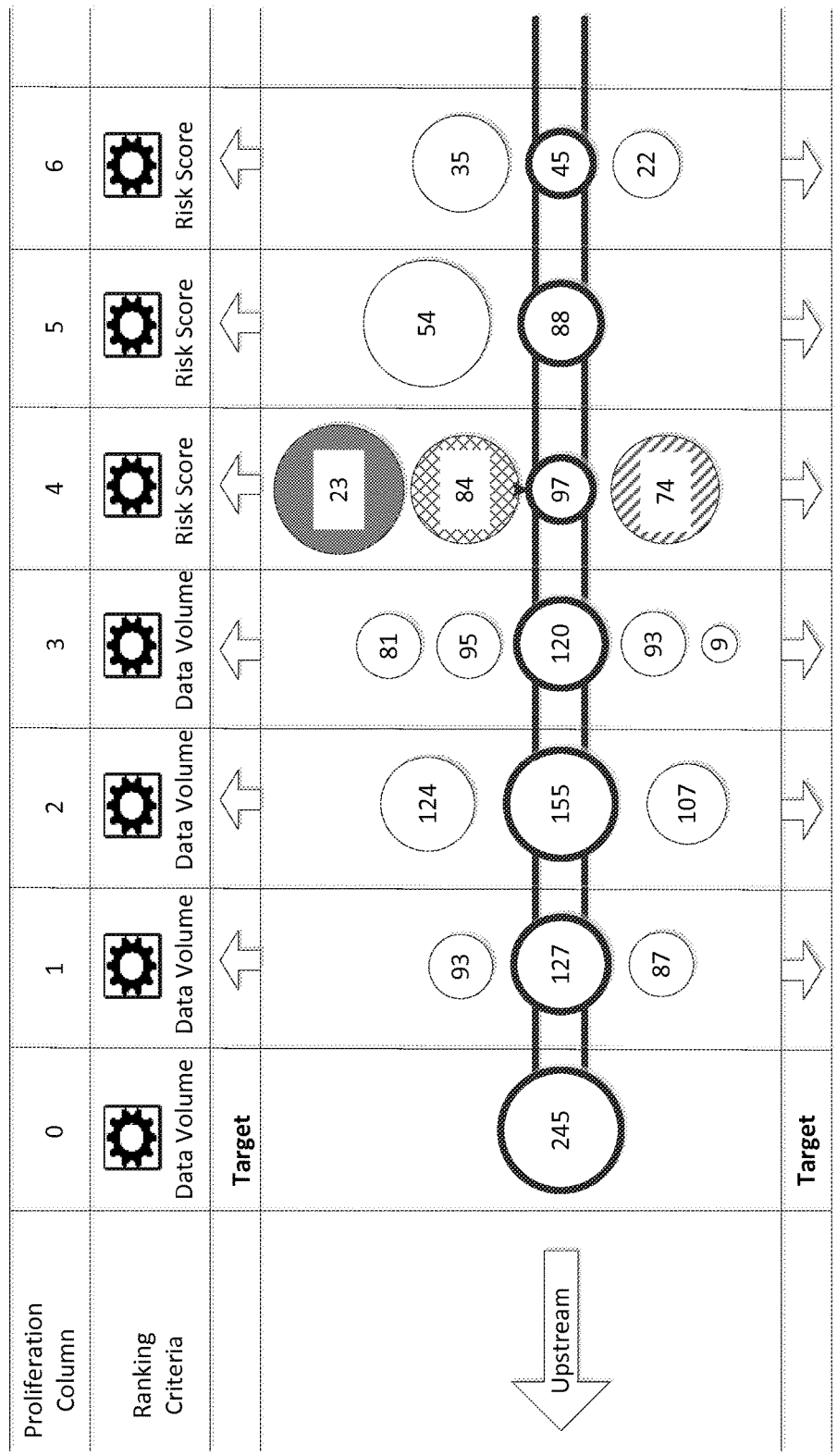

An example of updating a data proliferation graph in response to receiving an adjustment of the proliferation path is shown in FIGS. 11A-11C. For the purpose of explanation, proliferation nodes will be referred to by the numerical quantities indicated within them. However, it is understood that the proliferation nodes correspond to various data stores and that the numeral quantities shown reflect various characteristics or properties of the data stores (depending on the ranking criteria).

FIG. 11A illustrates a downstream proliferation path which goes through node 245 (the target node), node 127, node 155, node 120, node 260, node 110, and node 95. As shown in the figure, each of the proliferation columns are sorted according to data volume, with the proliferation node in the center of each column corresponding to the data store with the highest data volume in that column (and the number within each proliferation node indicating the data volume).

FIG. 11A also shows each of the proliferation nodes within column 4 using a different shading technique. Node 260 (corresponding to a data store with a data volume of 260) is darkly shaded, node 155 (corresponding to a data store with a data volume of 155) is shaded with diagonal lines, node 154 (corresponding to a data store with a data volume of 154) is cross-hatched, and node 95 (corresponding to a data store with a data volume of 95) is not shaded. The shading is presented only to aid in differentiating the nodes after the re-sort process in the later figures of the application, and would not necessarily be characteristic present in the actual data proliferation graph interface.

As shown in FIG. 11A, the user has selected the ranking criteria indicator in column 4, as shown by mouse pointer 1102. This selection brings up pop-up menu 1101, which lists some alternate ranking criteria that the user can select to re-sort the column, including risk score and jumps. Of course, other ranking criteria can also be listed, such as users, departments, age, etc.

Turning to FIG. 11B, the user has moved the mouse pointer 1102 to the "risk score" option for ranking criteria in the pop-up window 1101 and selected it.

FIG. 11C illustrates the result of the selection of the new ranking criteria of "risk score" for column 4. As shown in FIG. 11C, column 4 has been re-sorted according to risk score. Node 97 (corresponding to a data store with a risk score of 97) is now in the center of column and in the proliferation path. Based on the lack of shading, we can see that node 97 corresponds to node 95 in FIGS. 11A-11B. Similarly, based on the shading, we can see that node 23 in FIG. 11C corresponds to node 260 in FIGS. 11A-11B, node 84 in FIG. 11C corresponds to node 154 in FIGS. 11A-11B, and node 74 in FIG. 11C corresponds to node 155 in FIGS. 11A-11B.

As the proliferation node in the proliferation path for column 3 has not changed, these four proliferation nodes are still the immediate children of the parent node 120 in column 3 (corresponding to a data store with a data volume of 120). However, since the proliferation node in the proliferation path for column 4 has changed, this results in a completely different set of proliferation nodes for column 5 (the immediate children of the data store corresponding to node 97 in column 4) and a completely different set of proliferation nodes for column 6 (the immediate children of the data store corresponding to node 88 in column 5).

Another feature that is highlighted in FIG. 11C is the impact of a change in ranking criteria in a column on downstream columns. As shown in FIG. 11C, as a result of the user selecting a new ranking criterion of "risk score" for column 4, the ranking criteria for subsequent downstream columns has also been changed to "risk score." This is reflected by the fact that proliferation node 88 in column 5 is in the center of the column, even though it is smaller, in terms of data volume, then proliferation node 54 in column 5 (data volume is reflected in the size of the nodes, as discussed earlier). Of course, if the proliferation path was for an upstream route, then a change in ranking criteria for a particular column could impact the ranking criteria for subsequent upstream columns. Alternatively, a user can disable this effect of changing the ranking criteria associated with a particular column, such that selecting a new ranking criterion for a column does not have any effect on the ranking criteria for other columns.

Additionally, the selection of a particular ranking criteria for a column can be stored, so that a subsequent selection of ranking criteria in a different column does not overwrite the ranking criteria for that column or subsequent downstream columns (for downstream routes) or subsequent upstream columns (for upstream routes). For example, if a user subsequently selected a new ranking criterion of "jumps" for column 2 in FIG. 11C, then the ranking criteria for columns 2 and 3 would change to "jumps" but the ranking criteria for columns 4, 5, and 6 would remain "risk score."

To aid users in navigating a data proliferation graph which includes a large number of nodes, a macro view including a plurality of macro nodes corresponding to the plurality of data stores which have either received data that was previously on the target data store or which have sent data that was subsequently on the target data store can also be transmitted for display along with the data proliferation graph (or portion of the data proliferation graph).

Figure 12:
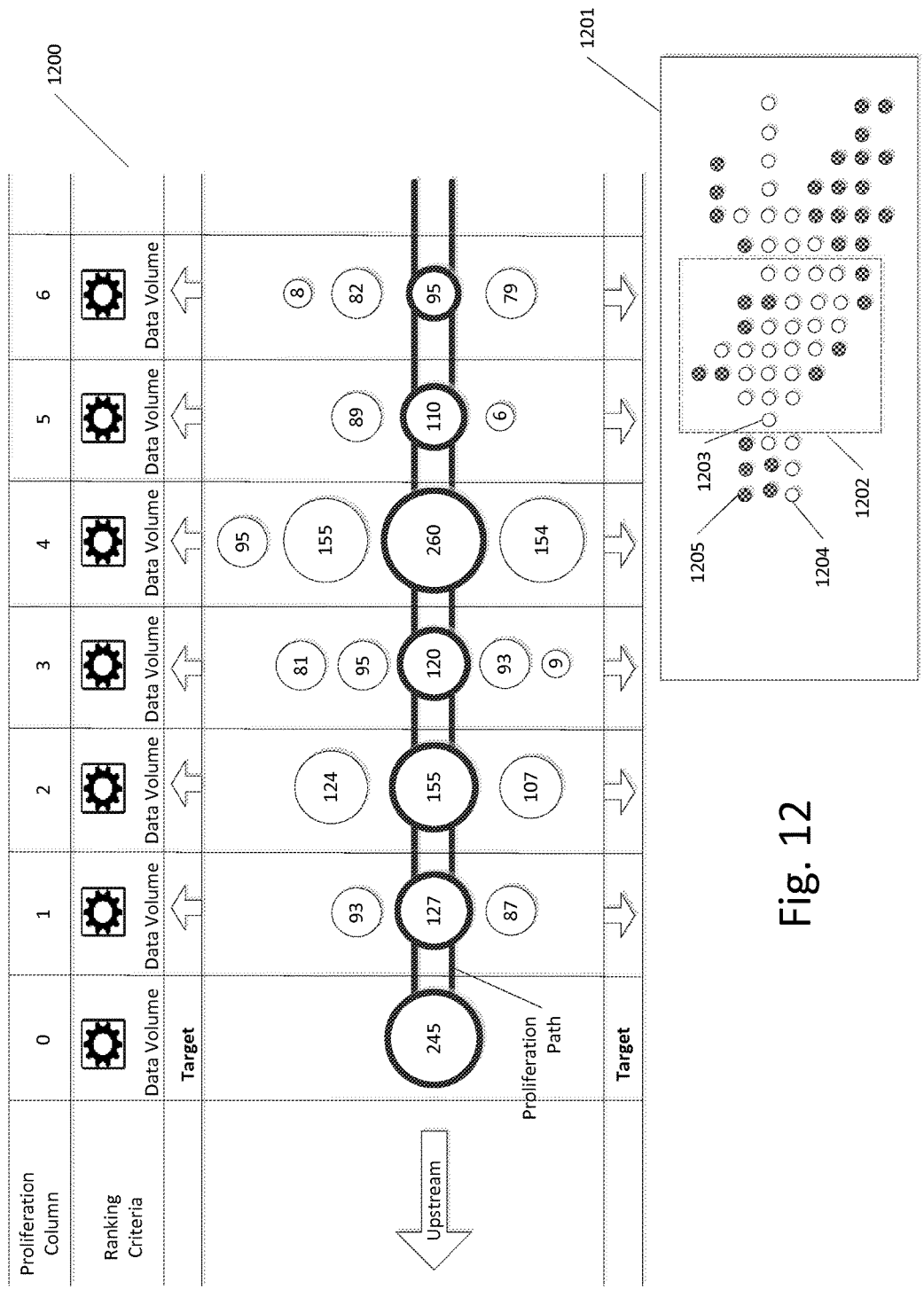
FIG. 12 illustrates features of a macro view according to an exemplary embodiment.

FIG. 12 illustrates an example of this macro view 1201 corresponding to a portion of data proliferation graph 1200. As indicated above, the macro view 1201 can include all of the data stores which have received data that was previously on the target data store (downstream data stores) and/or which have sent data that was subsequently on the target data store (upstream data stores). The macro view can use macro nodes to represent these data stores.

Additionally, a subset of the plurality of macro nodes corresponding to the plurality of proliferation nodes can be marked within the macro view to enable to user to clearly identify the proliferation nodes in the context of all of the macro nodes (some of which correspond to data stores that do not have proliferation nodes). For example, FIG. 12 shows macro nodes corresponding to proliferation nodes as clear circles, such as macro nodes 1203 and 1204, whereas macro nodes that do not have corresponding proliferation nodes are shown as shaded circles, such as macro node 1205.

When a portion of the data proliferation graph is being transmitted, the macro view can also include a focus window corresponding to the portion of the data proliferation graph that is being transmitted. This is shown in FIG. 12 as window 1202. The macro nodes in the focus window 1202 include macro nodes corresponding to the proliferation nodes shown in the portion of the data proliferation graph that is transmitted, as well as macro nodes for data stores that are not represented in the data proliferation graph. For example, macro node 1203 corresponds to the target node. Similarly, the second column in the focus window 1202 includes three macro nodes corresponding to proliferation nodes (clear circles) and the second column in the portion of the data proliferation graph 1200 (marked as proliferation column 1) includes three proliferation nodes. As shown FIG. 12, the third column in the focus window 102 of the macro view 1201 also includes three macro nodes corresponding to proliferation nodes (by contrast, the three shaded circles correspond to data stores that do not have proliferation nodes). This is mirrored in the portion of the data proliferation graph 1200, as the third column (marked as proliferation column 2) includes only three proliferation nodes.

A selection can be received from a user of a new focus window within the macro view corresponding to a second portion of the data proliferation graph and, in response to the selection, the second portion of the data proliferation graph can be transmitted within the interface.

Figure 13A:
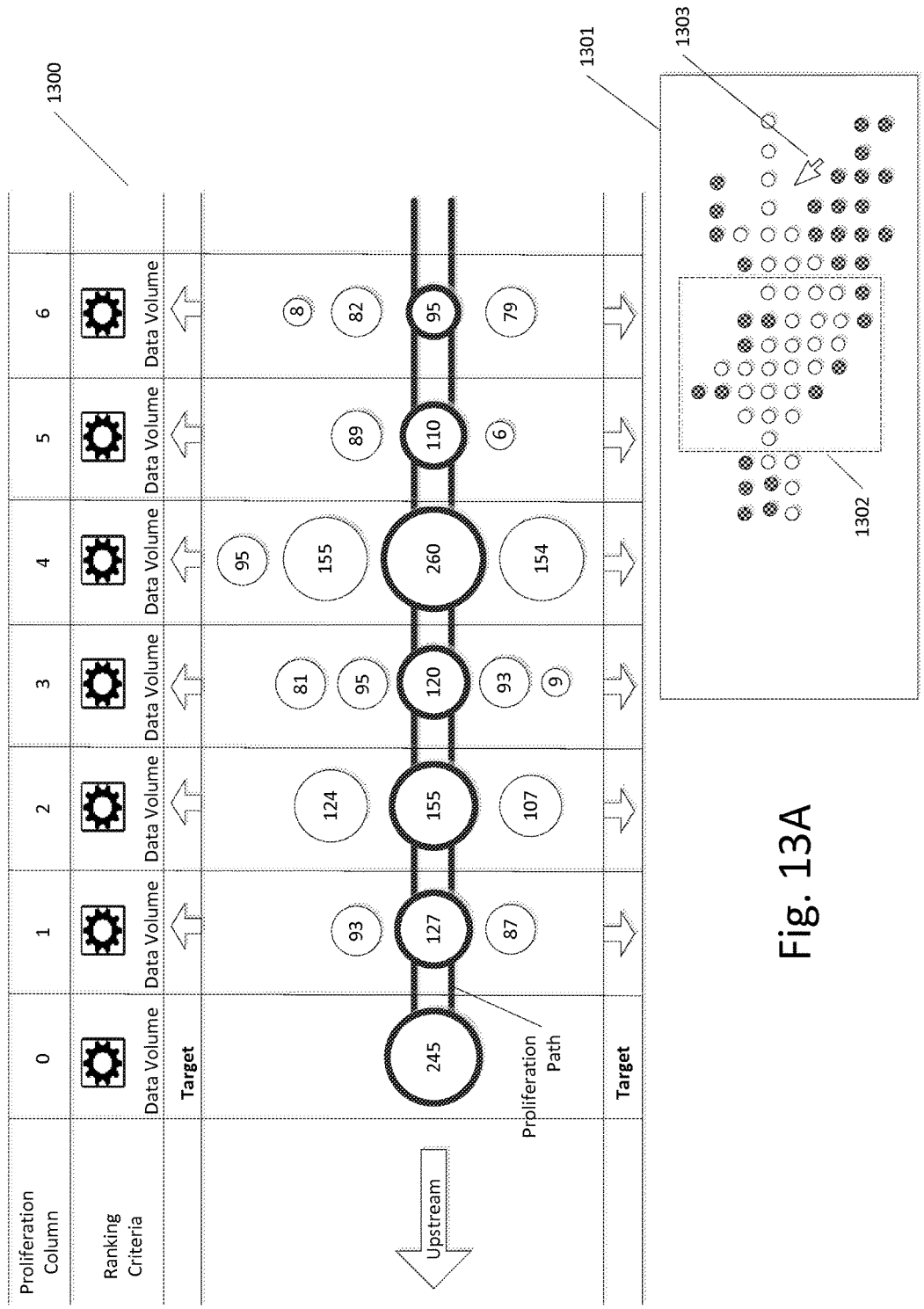
FIGS. 13A-13B illustrate an example of selecting a new focus window in a macro view according to an exemplary embodiment.
Figure 13B:
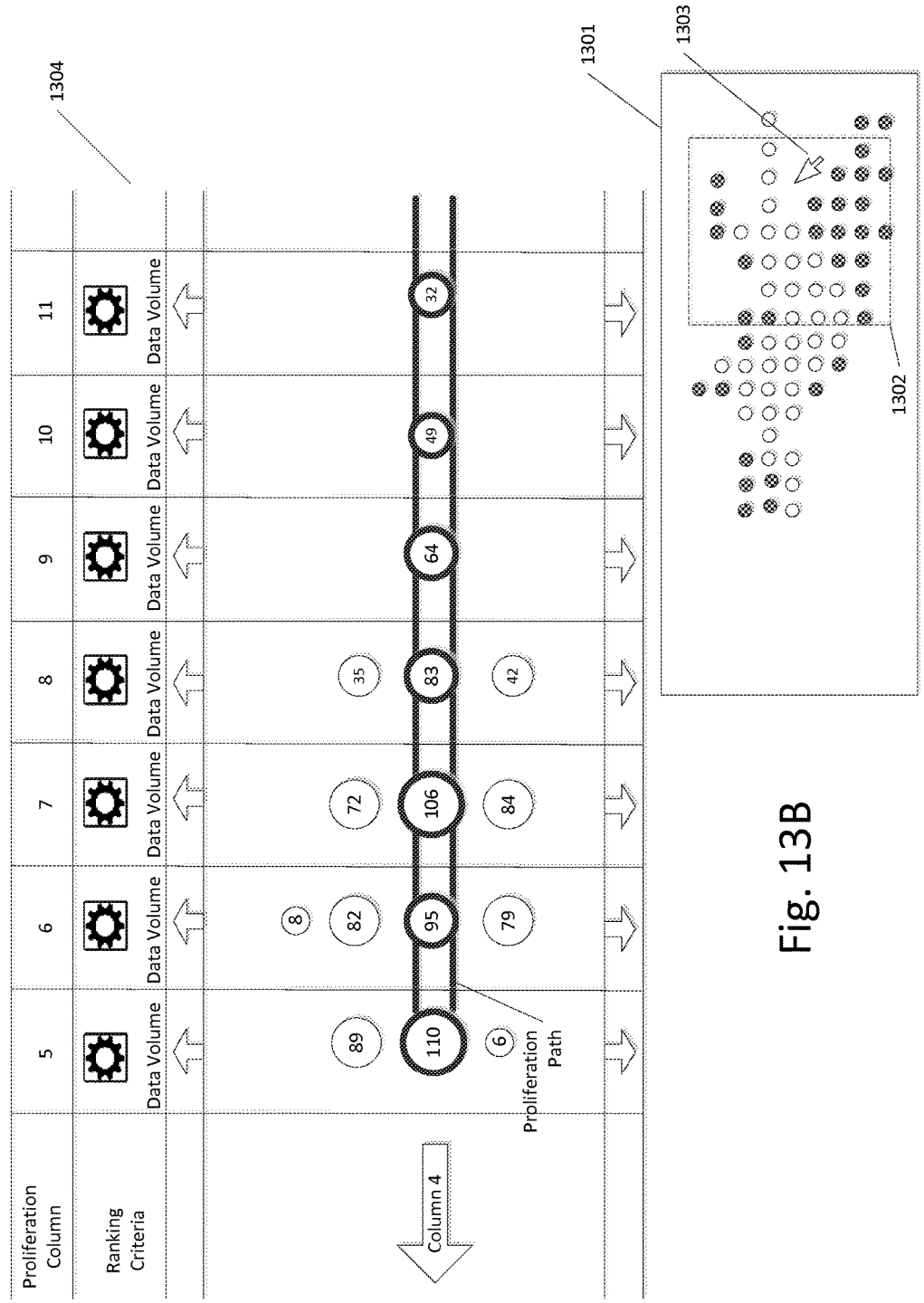

The selection can be received by clicking on a different portion of the macro view. An example of this is shown in FIGS. 13A-13B. A first portion of a data proliferation graph 1300 is shown in FIG. 13A. Also shown is a macro view 1301 including a focus window 1302 which corresponds to the first portion of the data proliferation graph 1300.

The user in FIG. 13A has moved the pointer 1303 to a different portion of the macro view 1301. FIG. 13B illustrates the change in the interface when the user clicks on the different portion of the macro view 1301. As shown in FIG. 13B, the focus window 1302 has moved to the selected portion of the macro view 1301 corresponding to the pointer 1303 and a second portion of the data proliferation graph 1304 is displayed which corresponds to the shifted focus window 1302.

Figure 14:
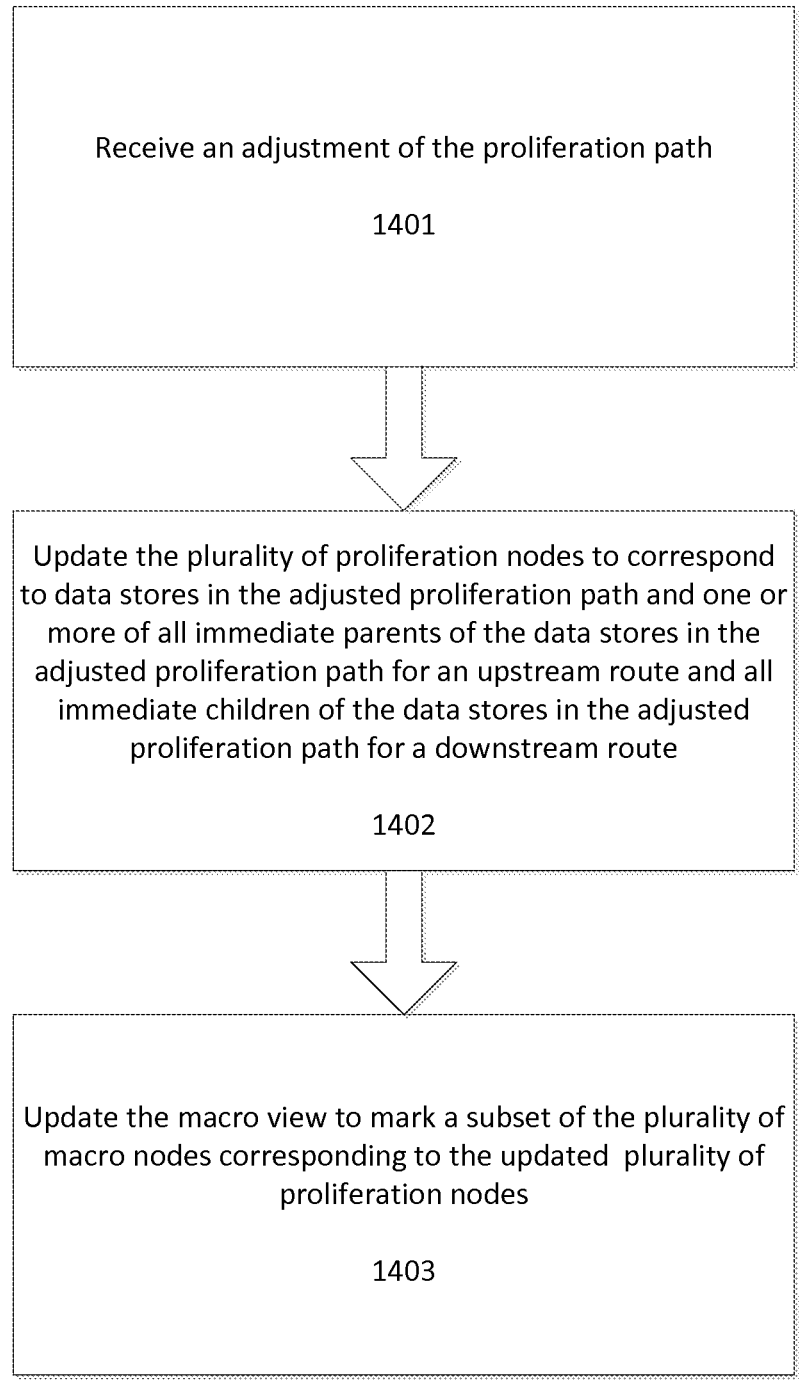
FIG. 14 illustrates a flowchart for updating proliferation nodes and a macro view based on an adjustment of the proliferation path according to an exemplary embodiment.

FIG. 14 illustrates a flowchart for updating a plurality of proliferation nodes and a macro view based on an adjustment of the proliferation. At step 1401, an adjustment of the proliferation path is received. This adjustment can be received via any of the method described in this specification, such as by dragging a new proliferation node into the proliferation path, re-sorting a column based on a ranking criteria, clicking an up or down arrow, or some combination of the disclosed techniques.

At step 1402, the plurality of proliferation nodes are updated to correspond to data stores in the adjusted proliferation path and one or more of all immediate parents of the data stores in the adjusted proliferation path for an upstream route and all immediate children of the data stores in the adjusted proliferation path for a downstream path.

At step 1403, the macro view is also updated to mark a subset of the plurality of macro nodes corresponding to the updated plurality of proliferation nodes. This step enables users to easily observe the changes in a proliferation path and corresponding proliferation nodes relative to the entire set of data stores when an adjustment of the proliferation is path is made.

Figure 15A:
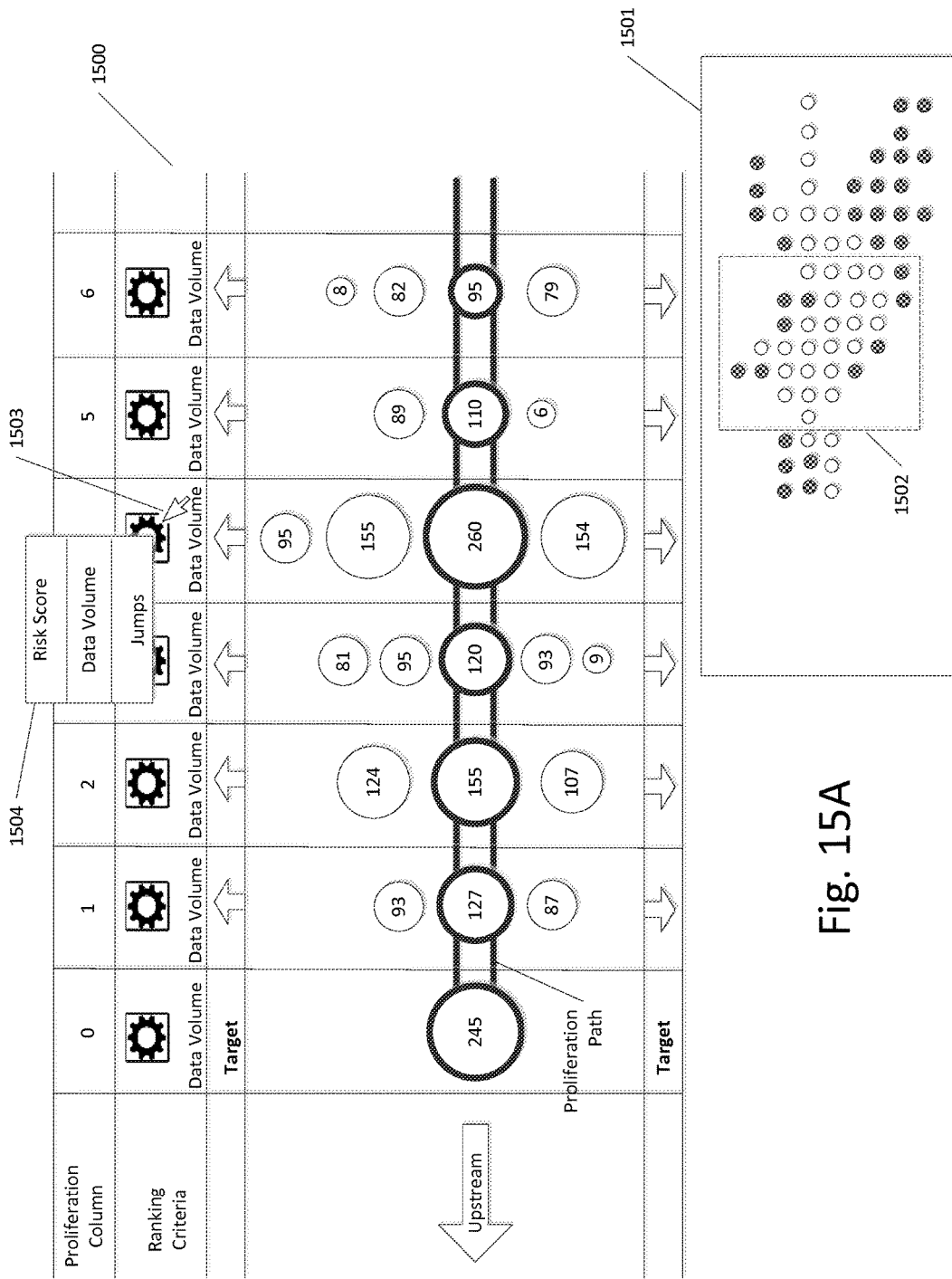
FIGS. 15A-15C illustrate an example of re-sorting one or more proliferation columns based on new ranking criteria and updating proliferation nodes and a macro view according to an exemplary embodiment.
Figure 15B:
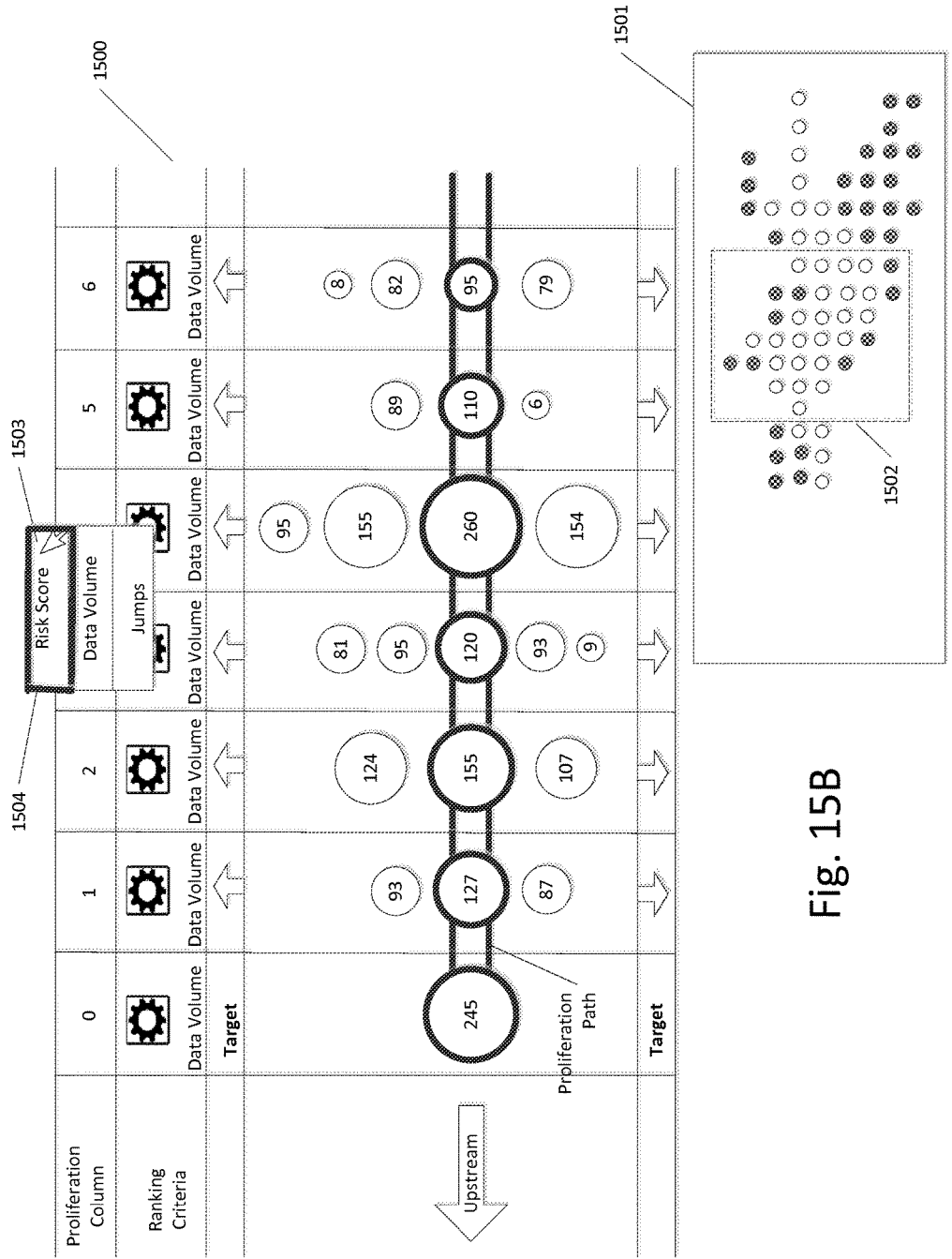
Figure 15C:
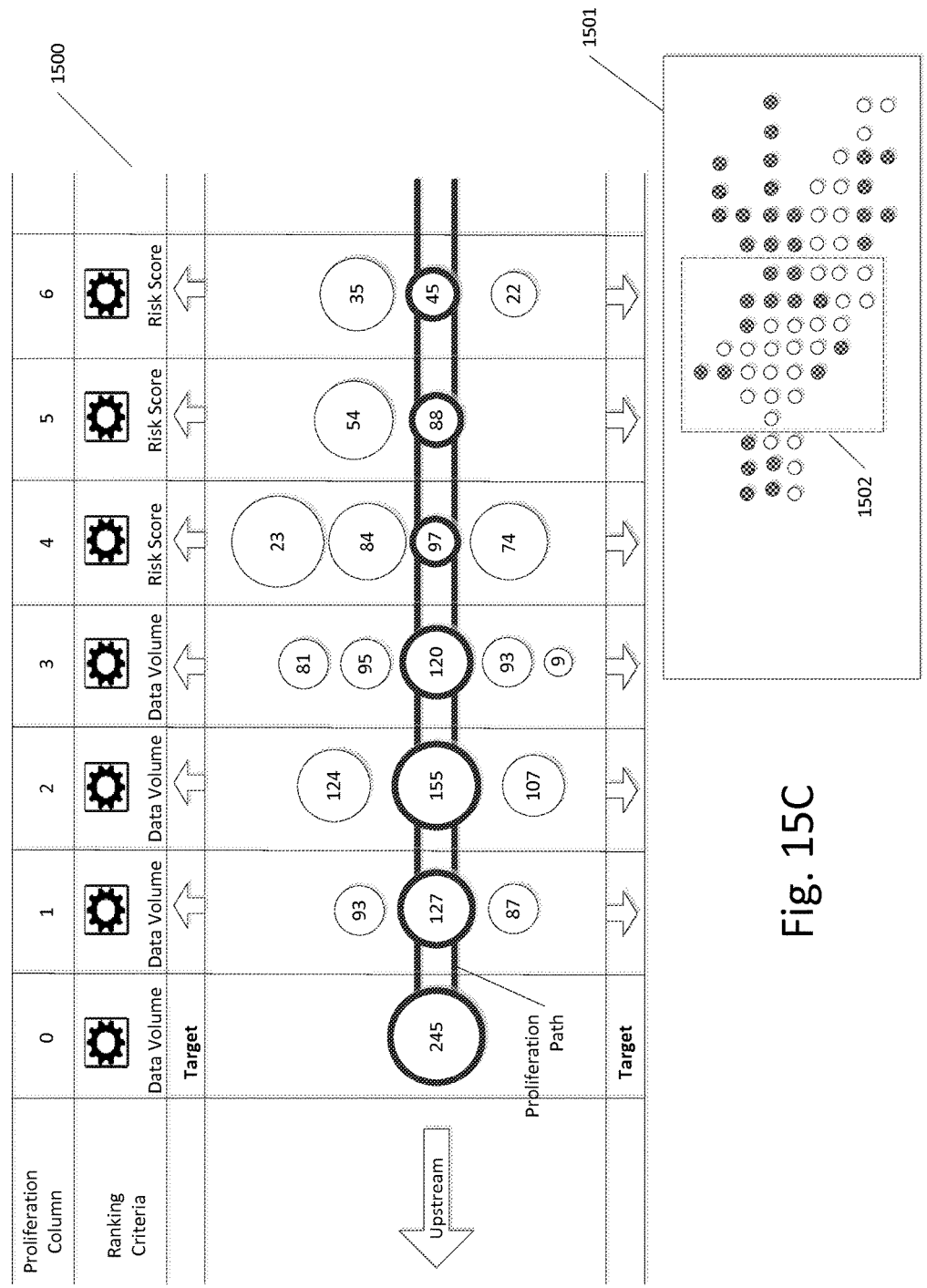

FIGS. 15A-15C illustrate an example of this process. As shown in FIG. 15A, a portion of a data proliferation graph 1500 is shown, along with a macro view 1501 having a focus window 1502 which corresponds to the portion of the data proliferation graph. The user in FIG. 15A has selected the ranking criteria for proliferation column 4 using pointer 1503 and pop-up window 1504 shows other possible ranking criteria which the user can select. Of course, the possible ranking criteria can include other options as discussed earlier in this application.

As shown in FIG. 15B, the user has moved the pointer 1503 over the "risk score" option in the pop-window and has selected it (such as by clicking) FIG. 15C illustrates the result of this selection. Similar to the re-ranking shown in FIG. 11C, the portion of the proliferation graph 1500 in FIG. 15C includes a different proliferation path as a result of the re-sorting of the proliferation nodes in proliferation column 4 and a new set of proliferation nodes for proliferation columns 5 and 6 as a result of the different proliferation path.

Additionally, as shown in FIG. 15C, the macro view 1501 has been updated to mark a subset of the plurality of macro nodes that correspond to the updated plurality of proliferation nodes in the data proliferation graph. Although the focus window 1502 is in the same position, the macro nodes within the focus window 1502 have been updated to reflect the updated proliferation nodes.

Figure 16:
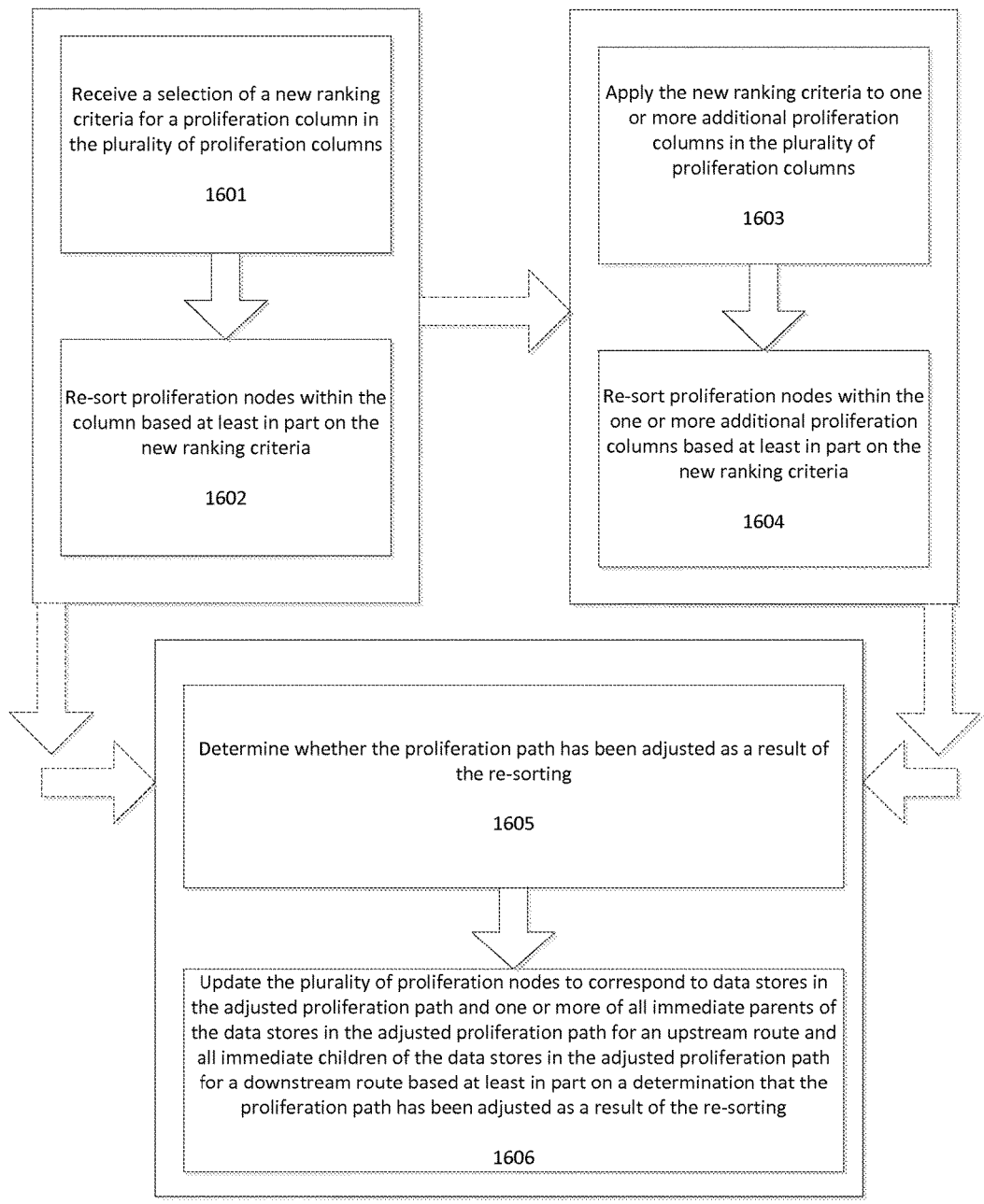
FIG. 16 illustrates a flowchart for applying a new ranking criteria to one or more proliferation columns in a plurality of proliferation columns of a data proliferation graph and updating proliferation nodes in the data proliferation graph according to an exemplary embodiment.

FIG. 16 illustrates a flowchart for applying a new ranking criteria to one or more proliferation columns in a plurality of proliferation columns of a data proliferation graph and updating proliferation nodes in the data proliferation graph accordingly. At step 1601 a selection of a new ranking criterion is received for a proliferation column in the plurality of proliferation columns. At step 1602 proliferation nodes within the column are re-sorted based at least in part on the new ranking criteria. Examples of these selection and re-sorting steps are shown in FIGS. 11A-11C and 15A-15C, where the risk score ranking criteria is selected for proliferation column 4 and used to re-sort that column.

Optionally, the process can proceed to step 1603, where the new ranking criteria is applied to one or more additional proliferation columns in the plurality of proliferation columns and then step 1604, where proliferation nodes within the one or more additional proliferation columns are re-sorted based at least in part on the new ranking criteria. As with steps 1601 and 1602, examples of steps 1603 and 1604 are shown in FIGS. 11A-11C and 15A-15C, where the risk score ranking criteria is applied to downstream proliferation columns 5 and 6 to re-sort those columns.

After either step 1604 or optionally after step 1602, the process can proceed to step 1605, where it is determined whether the proliferation path has been adjusted as a result of the re-sorting (either of the proliferation column in step 1602 or the one or more additional proliferation columns in step 1604). If it is determined that the proliferation path has been adjusted as a result of the re-sorting, then at step 1606 the plurality of proliferation nodes can be updated to correspond to data stores in the adjusted proliferation path and one or more of all immediate parents of the data stores in the adjusted proliferation path for an upstream route and all immediate children of the data stores in the adjusted proliferation path for a downstream route. This updating of the plurality of proliferation nodes is also shown in FIGS. 11A-11C and 15A-15C.

Figure 17:
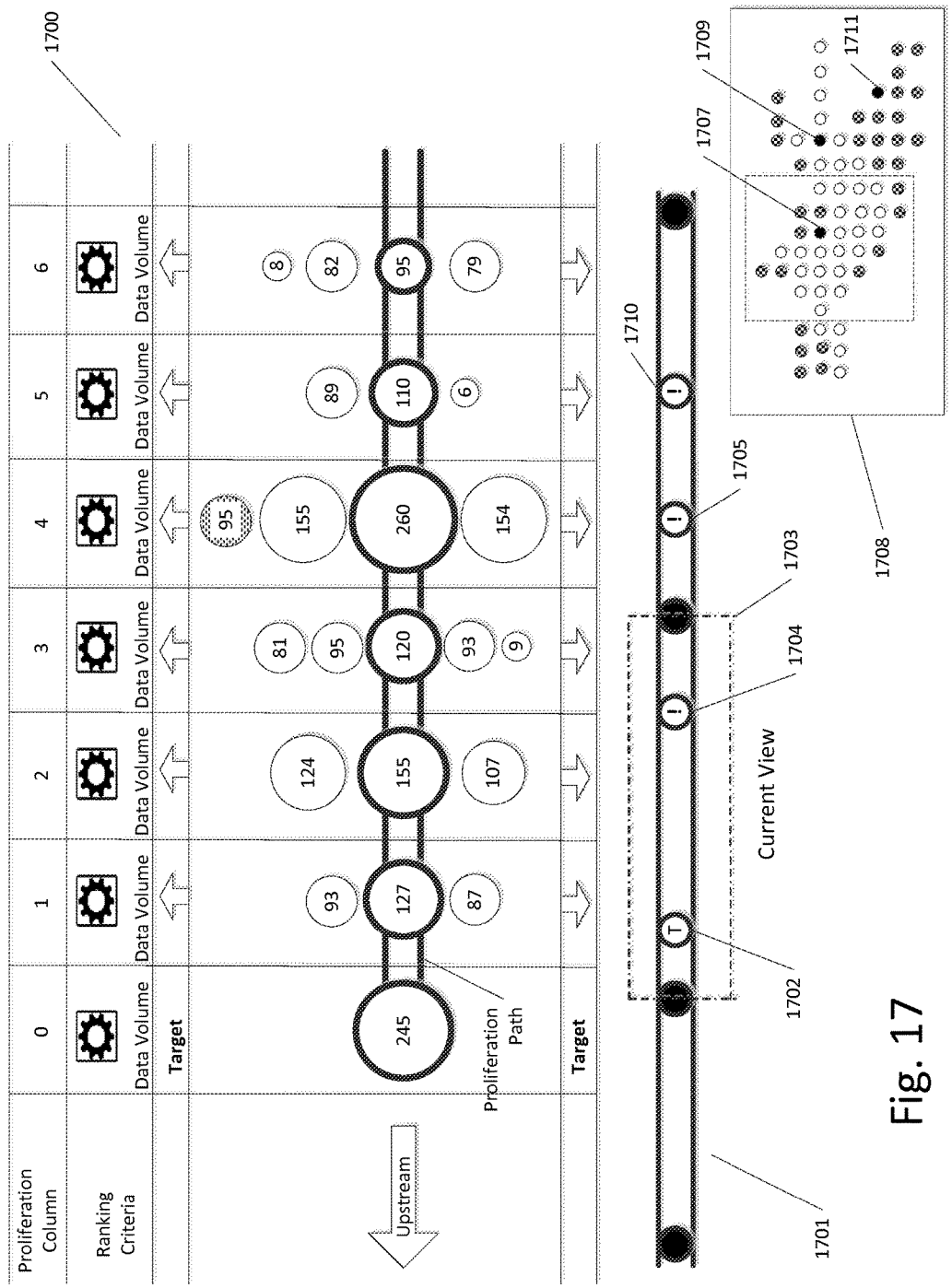
FIG. 17 illustrates a timeline bar and additional features of the macro view according to an exemplary embodiment.

The interface which transmits the data proliferation graph can include a number of additional features which make browsing, sorting through, and identifying problematic data stores easier for a user. FIG. 17 illustrates an interface including a portion of a data proliferation graph 1700, as well as macro view 1708.

The macro view 1708 in FIG. 17 is annotated to mark macro nodes corresponding to problematic or high-risk data stores in black, including macro nodes 1707, 1709, and 1711. The criteria for what comprises a problematic data store can be defined by a user, and can relate to the security of a data store, a risk score associated with a data store, a location of a data store, a size of the data store, a traffic volume of the data store, or any other characteristic of a data store. In this case, macro nodes 1707, 1709, and 1711 have been marked as problematic due to high risk scores, such as risk scores over 90 (on a 100 point scale). Of course, the macro nodes can be marked or visually identified using a variety of techniques, such as those described with reference to FIGS. 5A-5H. For example, high-risk macro nodes can be marked using the color red or a particular symbol.

By marking macro nodes within the macro view, the interface shown in FIG. 17 enables a user to identify problematic data stores even when the ranking criteria for a particular proliferation column makes detection of such data stores difficult. For example, node 95 in proliferation column 4, which is shaded, corresponds to marked macro node 1707. Therefore, even though proliferation column 4 is sorted according to a ranking criteria of data volume, a user can easily identify that the data store corresponding to that proliferation node has a high risk score.

Additionally, by marking macro nodes as problematic or high-risk, the interface enables identification of problematic data stores which do not have any corresponding nodes in the proliferation graph (which do not have corresponding proliferation nodes due to a certain proliferation path being selected). For example, marked macro node 1711 can correspond to a data store that does not have a corresponding proliferation node and therefore would not be represented in the proliferation graph.

Another feature shown in FIG. 17 is the timeline bar 1701 which corresponds to the horizontal length of the data proliferation graph. The timeline bar 1701 can have indicators corresponding to different portions of the data proliferation graph. For example, in the timeline bar 1701 of FIG. 17, the portion of the data proliferation graph upstream of the target data store is between the first two black circles, the target column and first six proliferation columns are between the second two black circles, and the remaining portions are between the last two black circles.

The timeline bar includes a current view window 1703 which corresponds to the portion of the data proliferation graph 1700 shown (as well as the focus window in the macro view). Of course, the timeline bar 1701, indicators, and current view window 1703 do not need to be exactly proportional in all respects to the length of the data proliferation graph or portion that is being viewed, but can be used to approximate a position along the data proliferation graph. The current view window 1704 can also be used to browse different portions of the data proliferation graph, similar to the focus window of the macro view.

Additionally, timeline bar 1701 can include timeline markers identifying important data stores, such as the target data store, indicated by timeline marker 1702. The timeline markers can also identify problematic data stores in the data proliferation graph, such timeline markers 1704 (which corresponds to marked macro node 1707 and proliferation node 95 in proliferation column 4), 1705 (which corresponds to marked macro node 1709), and 1710 (which corresponds to marked macro node 1711).

Figure 18:
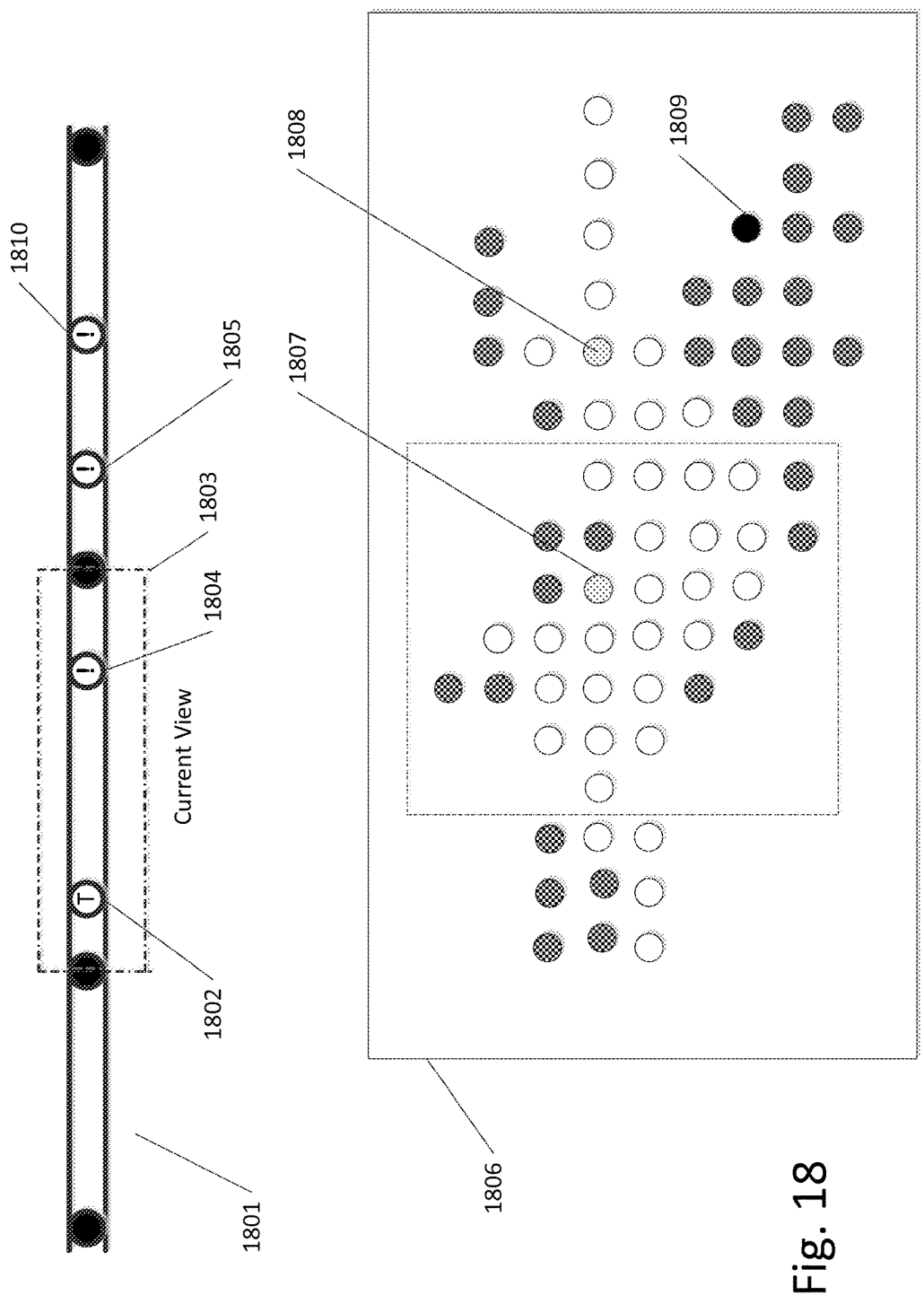
FIG. 18 illustrates a timeline bar and macro view in greater detail according to an exemplary embodiment.

FIG. 18 illustrates another example of the timeline bar 1801 and corresponding macro view 1806 according to an exemplary embodiment. Once again, timeline bar 1801 includes a current view window 1803, timeline markers corresponding to the target data store (1802) and problematic data stores (1804, 1805, and 1810). However, as shown in FIG. 18, the macro view can use different variations of markings to indicate problematic data stores. For example, marked macro nodes 1807 and 1808 are lightly shaded to denote a problematic data store which appears in the data proliferation graph (which has a corresponding proliferation node). By contrast, marked macro node 1809 is completely black to denote a problematic data store which does not appear in the data proliferation graph (which does not have a corresponding proliferation node).

Of course, changes to the proliferation graph, such as adjustment of the proliferation graph, selection of a new ranking criteria, selection of a new problematic data store criteria by a user, or selection of some filter by a user can result in a revision of the timeline bar and/or the macro views shown in FIGS. 17-18.

Figure 19:
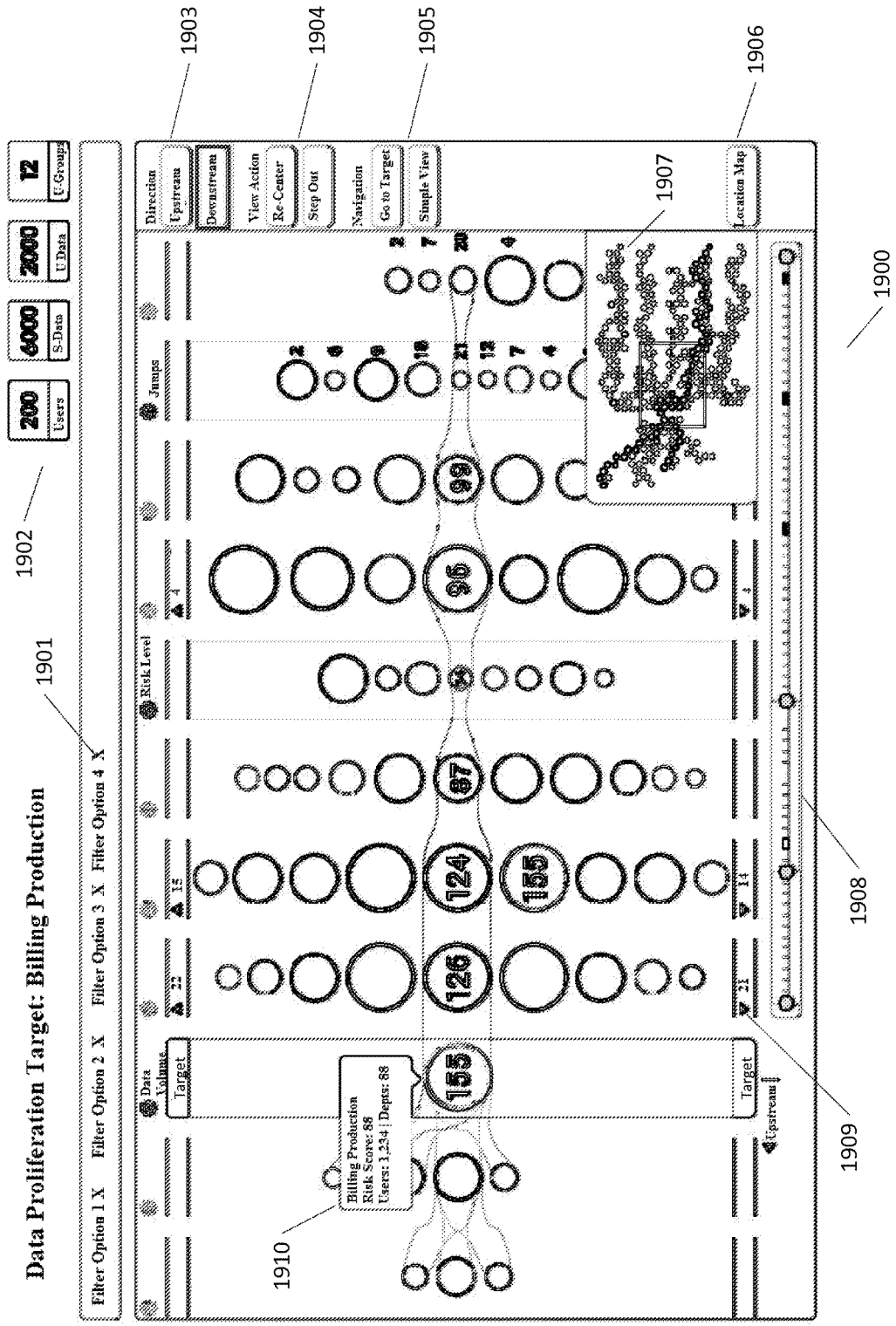
FIG. 19 illustrates an exemplary interface including a variety of additional features

FIG. 19 illustrates an example interface 1900 incorporating many of the discussed features and many additional features which can be incorporated into the system and method disclosed herein. As shown in FIG. 19, the user has selected a number of filter options 1901 which filter the data stores used to generate the data proliferation graph. These filter options can pertain to time constrains, traffic constraints, necessary data store characteristics, users, types of data, user groups, or any other applicable constraints.

The boxes 1902 at the top of the interface 1900 indicate summary statistics for the data proliferation graph and/or all of the data stores, such as the total number of users represented, the amount of sensitive data (such as sensitive data columns for relational or tabular data) represented, an amount of user data represented, and/or a number of user groups represented.

Direction controls 1903 allow a user to select a direction of analysis or propagation of the data proliferation graph relative to the target data store, such as upstream or downstream. As shown in the figure, downstream is currently selected.

View controls 1904 allow a user to select a view command, such as re-centering the data proliferation graph or stepping out of the current view to a larger view. View controls can also include commands such as zoom in or zoom out.

Navigation controls 1905 include controls to go to the target node in the data proliferation graph or to view a simpler version of the data proliferation graph which remove or omit one or more of the features described herein.

The location map button 1906 can be used to toggle the macro view 1907 on or off as the user requires. The default setting can be off and the user can turn it on when they wish to view the entire data proliferation graph. As shown in the figure, the macro view indicates the proliferation nodes with marked macro nodes which are darker than macro nodes which do not have corresponding proliferation nodes.

Interface 1900 also includes timeline bar 1908 which represents the target data store with a small white rectangle and problematic data stores with dark rectangles. Additionally, interface 1900 includes up and down arrows for each proliferation column, such as down arrow 1909, which allow users to scroll up or down with a proliferation column or bring a new proliferation node into the proliferation path (indicated by dual lines running down the center of the data proliferation graph). Of course, a user can also move the proliferation nodes by clicking and dragging on them. Next to the arrows in some columns are numbers indicating any additional nodes which are in the proliferation column but which are not displayed due to space constraints.

As shown in the figure, the user has selected the target node, bringing up the pop-up window 1910 which provides additional details about the target data store, such as the name of the target data store ("Billing Production"), the risk score, the departments, and the users.

Additionally, interface 1900 illustrates the multi-tiered ranking criterion that can be used for multiple proliferation columns, as proliferation columns 1-3 are sorted according to data volume (based on the selection above the target column), proliferation columns 4-6 are sorted according to risk level (based on the selection above proliferation column 4), and proliferation columns 7-8 are sorted according to jumps (based on the selection above proliferation column 7).

In addition to the context and application of data proliferation, any of the methods and systems described herein with reference to FIGS. 1-19 can be utilized to generate a graph in a variety of other contexts and for a variety of different applications which require visualization of large data sets spread between large numbers of nodes. For example, the methods and systems described herein can be utilized to generate a relationship graph between people, such as users of a particular social media site or social networking service.

Figure 20:
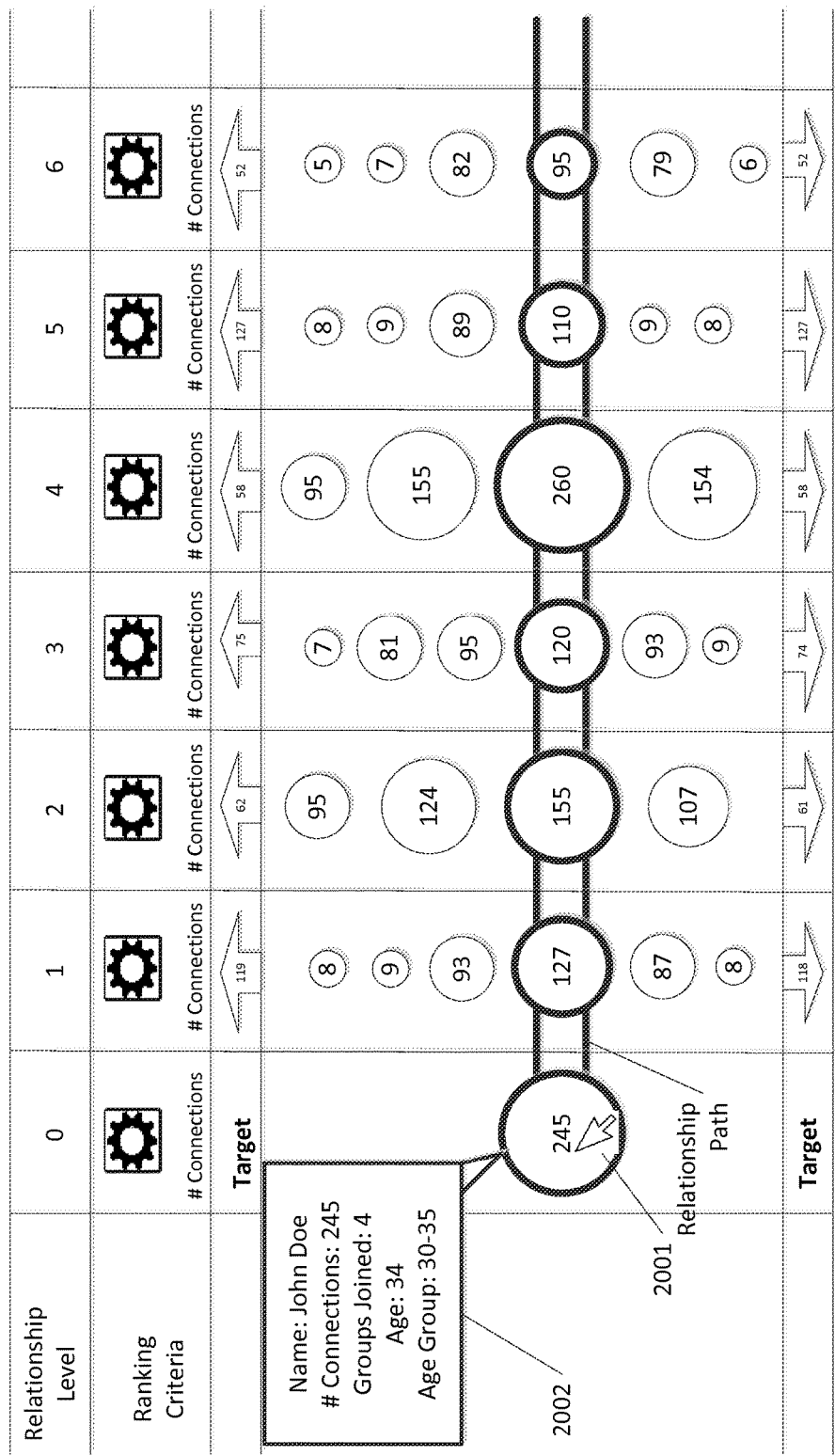
FIG. 20 illustrates a portion of a personal relationship graph according to an exemplary embodiment.

FIG. 20 illustrates a personal relationship graph in which each of the nodes corresponds to a person or to an account or profile associated with a person. As shown in FIG. 20, the relationship of a target person (with a corresponding to target node) to a plurality of other persons (each with their own nodes) can be visualized using the techniques and methods described in this application.

As shown in FIG. 20, a plurality of relationship nodes corresponding to a plurality of people who are connected with the target person can be divided into a plurality of relationship columns corresponding to relationship levels which themselves correspond to degrees of separation from the target person. For example, the relationship nodes in relationship level 1 would correspond to people who are directly connected to the target person. Similarly, the relationship nodes in relationship level 2 would correspond to people who are directly connected to the relationship node in relationship level 1 which is in the "relationship path" (which is similar to the proliferation path as discussed earlier).

Connected can mean connected through a social media site, social networking application, chat application, professional networking site or application, email contacts list, picture sharing website or application, or any other similar sites or applications. Some examples of connections include Facebook™ friends, Instagram™ follower users and following users, Twitter™ follower users and following users, LinkedIn™ connections, Outlook™ contacts, Gmail™ contacts, etc.

In FIG. 20, a user has moved a pointer 2001 over the target node, causing pop-up window 2002 to appear which lists additional details about the target person account corresponding to the target node. As shown in the pop-up window, the details include a person name, number of connections, groups that the person is a member of, age of the person, and age group of the person. Of course, these examples are provided for illustration only and the details can include any attribute associated with a person or any attribute associated with a profile and/or account belonging to the person.

The relationship nodes in each of the relationship columns in FIG. 20 are sorted according to the number of connections associated with each relationship node, with the node having the largest number of connections in the middle. Of course, the relationship nodes can be sorted within columns using any attribute associated with a person or any attribute associated with a profile and/or account belonging to the person. For example, the relationship nodes in a particular relationship column can be sorted according to age group, with a target age group displayed closer to the center of the column. Similar to the data proliferation graph, this re-sorting would result in a re-calculation of the relationship path and alter the columns of the graph for downstream nodes.

The graph shown in FIG. 20 can be a portion of a relationship graph and a macro view (as discussed earlier) can be used to view all macro nodes corresponding to all persons connected to the target person. In this case, the macro view can indicate which of the macro nodes correspond to "relationship nodes" which are either on the relationship path or immediate children of relationship node. Additionally, any of the methods and techniques described with reference to FIGS. 1-19 can be utilized to generate, display, or alter the relationship graph shown in FIG. 20.

Figure 21:
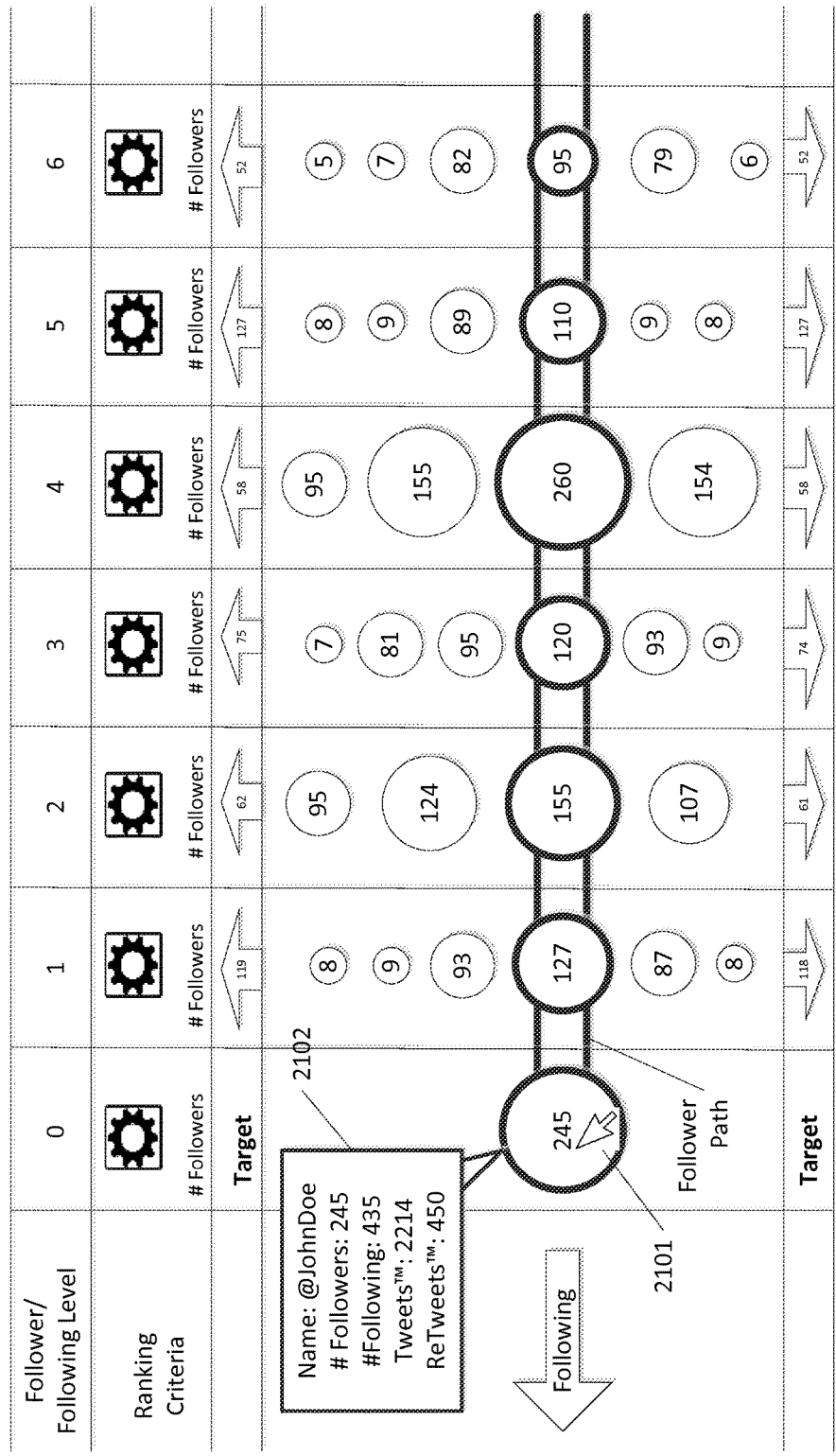
FIG. 21 illustrates a portion of a social media follower and following graph according to an exemplary embodiment.

FIG. 21 illustrates another application of the graph visualization and generation methods and systems described herein. As shown in FIG. 21, a connectedness graph has been generated for Twitter™ follower accounts and following accounts of a particular target account. The graph shown in FIG. 21 can also be a portion of a larger connectedness graph. Of course, this graph can also correspond to any type of application or social media service where two types of relationships exist between users or accounts, such as Instagram™ follower users and following users.

The nodes downstream (to the right of) of the target node in FIG. 21 can correspond to connected follower accounts and can be organized into columns corresponding to the follower level. In this case, the follower level can correspond to the degrees of separation of each account from the target account. For example, the nodes in follower level 1 correspond to accounts which are direct followers of the account associated with the target node. The nodes in follower level 2 correspond to accounts which are direct followers of the account associated with the node in the follower path in follower level 1, and so on.

The node upstream (to the left of) the target node in FIG. 21 can correspond to connected following accounts (not shown) and can be organized into columns corresponding to the following level. The following level can correspond to the degrees of separation of each account from the target account. For example, the nodes in following level −1 correspond to accounts which are directly followed by the account associated with the target node. The nodes in following level −2 correspond to accounts which are directly followed by the account associated with the node in the following path in following level −1, and so on.

As shown in FIG. 21, a user has moved a pointer 2101 over the target node, causing pop-up window 2102 to display information about the target account associated with the target node. In this case, the information includes a name (or handle), a number of follower accounts, a number of following accounts, a number of Tweets™, and a number of ReTweets™ (which can indicate the number of times that any Tweet™ by the account has been ReTweeted™ or which can indicate the number of times that a particular Tweet™ by the account has been ReTweeted™). The information can also include additional account related information, such a number of favorites (which can indicate the number of times that any Tweet™ by the account has been designated a favorite, the number of times that a particular Tweet™ by the account has been designated a favorite, or the number of Tweets™ that have been designated a favorite by the account), location, age, age group, or any other attribute or characteristic associated with a user account.

The nodes in the columns in FIG. 21 are shown sorted within each column according to the number of total followers of each of the accounts corresponding to the nodes, with the node corresponding to the account with the highest number of followers in the middle of each column. Of course, the ranking criteria can be adjusted or changed by the user to sort nodes within each column according to any other characteristic or attribute of the underlying accounts, such as a number of following accounts, a number of Tweets™, a number of ReTweets™, a number of favorites, an age group, or any other attribute or characteristic associated with a user account.

Similar to earlier examples (such as the data proliferation graph and relationship graph), a re-sorting of a particular column can result in a new determination of a follower/following path in the connectedness graph. A user can also adjust these paths by sliding, dragging, or otherwise manipulating nodes within a particular column into and out of the path. Additionally, any of the methods and techniques described with reference to FIGS. 1-19 (such as the macro view) can be utilized to generate, display, or alter the connectedness graph shown in FIG. 20.

Figure 22:
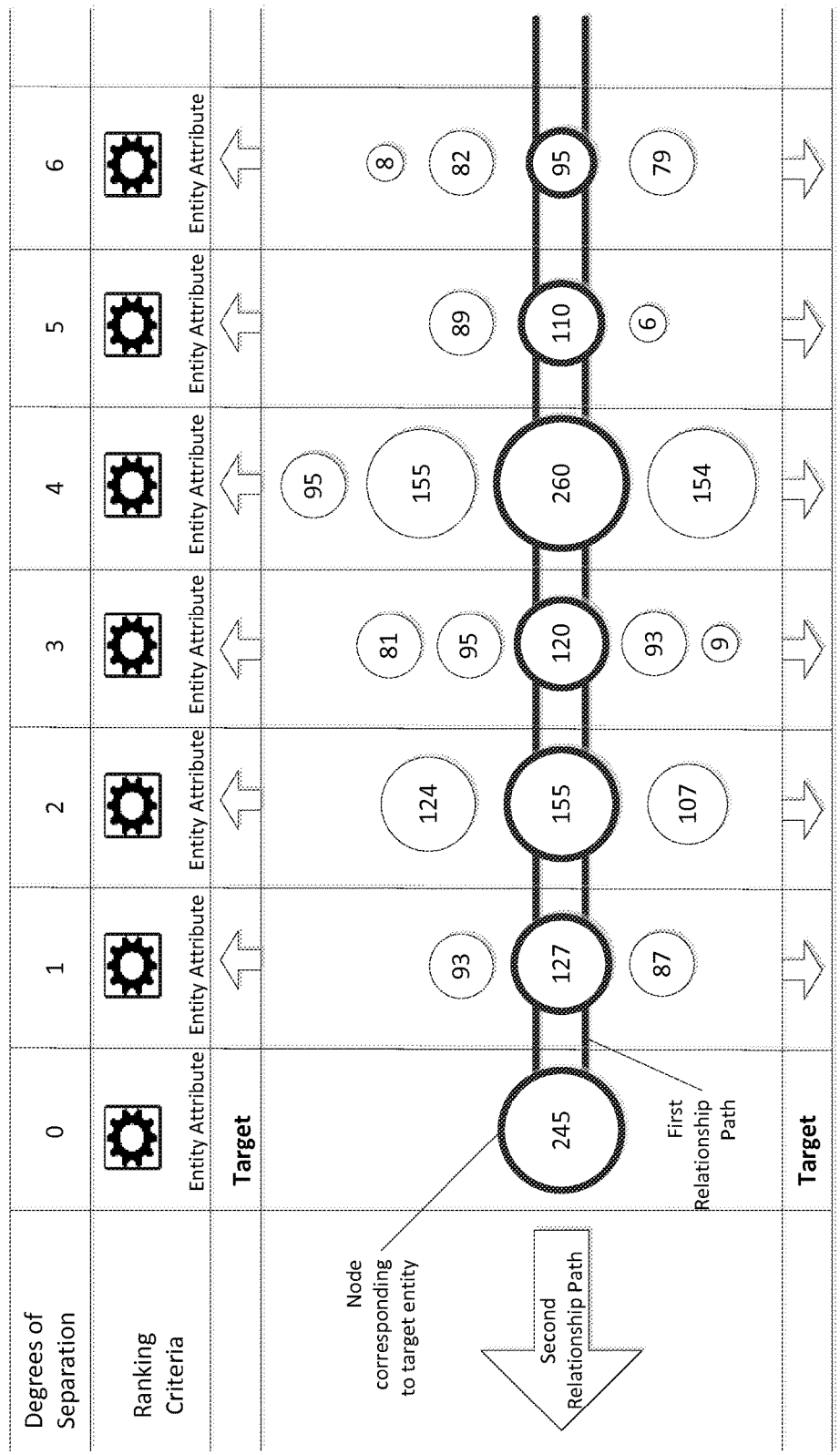
FIG. 22 illustrates a portion of a generalized relationship graph according to an exemplary embodiment.

As discussed earlier, the graph visualization systems and method described herein can be used for a variety of different applications and data sets. FIG. 22 illustrates a generalized example of a relationship graph (or portion of a relationship graph) which has been generated for a target entity.

As shown in FIG. 22, a target node corresponding to the target entity is located in a target column. Additionally, the relationship graph can include a plurality of additional nodes corresponding to a plurality of additional entities which are connected to the target entity through some relationship.

These additional nodes can be separated according to the specific type of relationship of the additional entity with the target entity. For example, nodes corresponding to entities that are connected to the target entity through a first type of relationship can be displayed downstream (to the right of) the target node, as shown in FIG. 22. Additionally, nodes corresponding to entities that are connected to the target entity through a second type of relationship can be displayed upstream (to the left of) the target node.

Furthermore, the additional nodes can be divided into columns within each direction based on the degrees of separation between the entities associated with the additional nodes and the target entity. The degrees of separation can correspond to the number of jumps within each relationship type required to reach a particular entity from the target entity. For example, the nodes in column 1 can correspond to entities that are 1 degree of separation from the target entity based on the first relationship type. Similarly, the nodes in column −1 can correspond to entities that are 1 degree of separation from the target entity based on the second relationship type.

Additionally, the nodes within each column can be sorted according to any ranking criteria associated with the entities, such as some entity attribute or characteristic. The value of each node according to the ranking criteria can be reflected by the node, such as with a numeral in the node or the size, shape, color, texture, thickness or other characteristic of the node.

The additional nodes which are included in the relationship graph can be determined based on a relationship path from the target entity through the additional entities. Additional nodes corresponding to entities connected to the target entity through a first relationship type can include nodes corresponding to entities on the first relationship path and all children of entities on the first relationship path. Additional nodes corresponding to entities connected to the target entity through a second relationship type can include all nodes corresponding to entities on the second relationship path and all parents of entities on the second relationship path. The system can also determine and/or display macro nodes corresponding to entities which are connected to the target entity through a relationship but which are not on the relationship path or which are not children (for the first relationship path) or parents (for the second relationship path) of any nodes on either the first or second relationship path.

Similar to the other graphs discussed in this application, the relationship paths in the relationship graph of FIG. 22 can be adjusted, such as by re-sorting a particular column according to some new ranking criteria, or by dragging, selecting, or otherwise manipulating nodes into and out of the relationship paths. This would result in a new determination of additional nodes in any downstream or upstream columns affected by the adjustment. Of course, any of the methods and techniques described with reference to FIGS. 1-19 (such as the macro view or timeline bar) can be utilized to generate, display, or alter the relationship graph shown in FIG. 22.

Some additional applications of the relationship graphs described throughout this application and FIG. 22 include: displaying a family tree of a particular person with upstream ancestors and downstream descendants, tracking versions of a particular project, software, or document with older versions upstream and newer versions downstream, evolutionary modeling of a particular organism with upstream evolutionary ancestors and downstream evolutionary descendants, modeling of solutions generated by a genetic algorithm or artificial intelligence algorithm with upstream solution ancestors and downstream solution descendants, biological modeling of a particular cell, virus, or microorganism with upstream precursors and downstream mutations.

Figure 23:
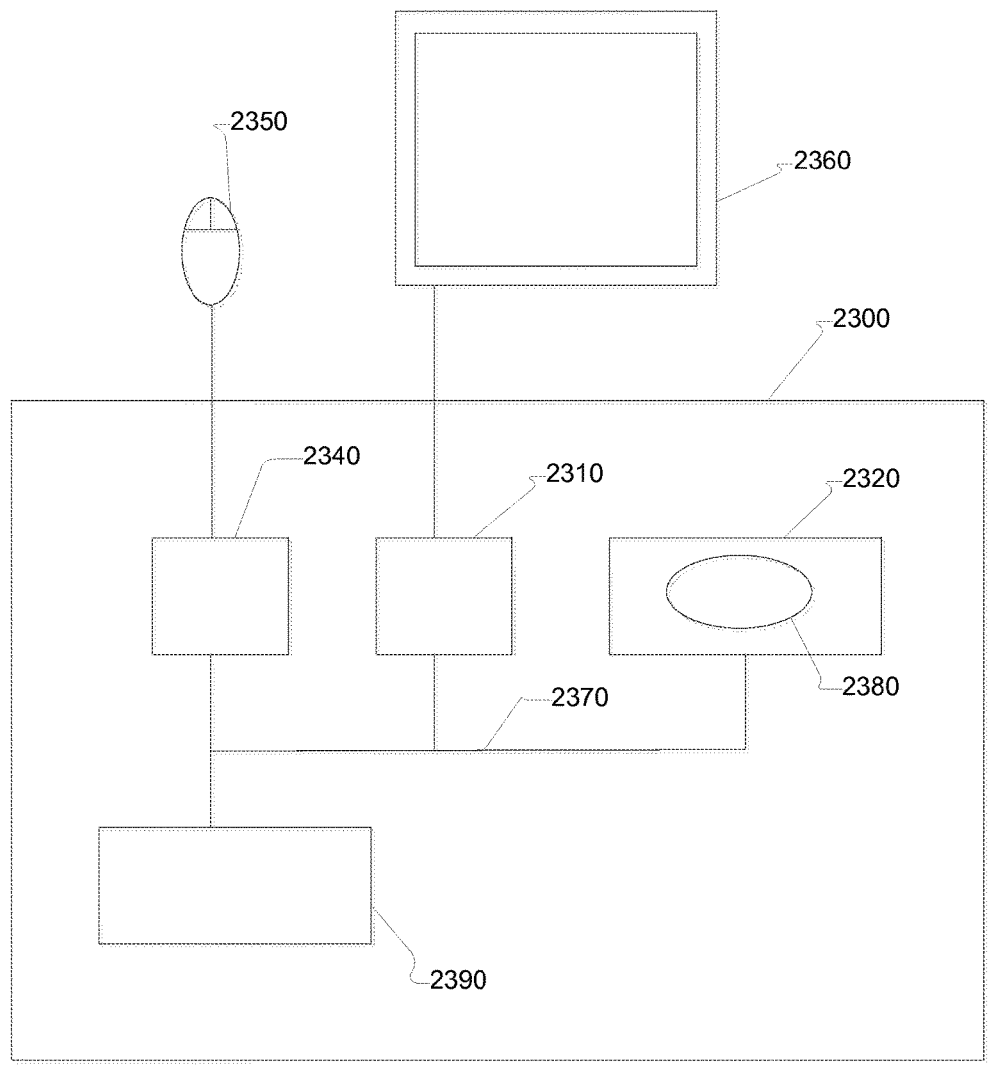
FIG. 23 illustrates an exemplary computing environment that can be used to carry out the method for parallelization of a computer program on a plurality of computing cores according to an exemplary embodiment.

One or more of the above-described techniques and interfaces can be implemented in or involve one or more computer systems. FIG. 23 illustrates a generalized example of a computing environment 2300. The computing environment 2300 is not intended to suggest any limitation as to scope of use or functionality of a described embodiment.

With reference to FIG. 23, the computing environment 2300 includes at least one processing unit 2310 and memory 2320. The processing unit 2310 executes computer-executable instructions and may be a real or a virtual processor. In a multi-processing system, multiple processing units execute computer-executable instructions to increase processing power. The memory 2320 may be volatile memory (e.g., registers, cache, RAM), non-volatile memory (e.g., ROM, EEPROM, flash memory, etc.), or some combination of the two. The memory 2320 may store software instructions 2380 for implementing the described techniques when executed by one or more processors. Memory 2320 can be one memory device or multiple memory devices.

A computing environment may have additional features. For example, the computing environment 2300 includes storage 2340, one or more input devices 2350, one or more output devices 2360, and one or more communication connections 2390. An interconnection mechanism 2370, such as a bus, controller, or network interconnects the components of the computing environment 2300. Typically, operating system software or firmware (not shown) provides an operating environment for other software executing in the computing environment 2300, and coordinates activities of the components of the computing environment 2300.

The storage 2340 may be removable or non-removable, and includes magnetic disks, magnetic tapes or cassettes, CD-ROMs, CD-RWs, DVDs, or any other medium which can be used to store information and which can be accessed within the computing environment 2300. The storage 2340 may store instructions for the software 2380.

The input device(s) 2350 may be a touch input device such as a keyboard, mouse, pen, trackball, touch screen, or game controller, a voice input device, a scanning device, a digital camera, remote control, or another device that provides input to the computing environment 2300. The output device(s) 2360 may be a display, television, monitor, printer, speaker, or another device that provides output from the computing environment 2300.

The communication connection(s) 2390 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 2300, computer-readable media include memory 2320, storage 2340, communication media, and combinations of any of the above.

Of course, FIG. 23 illustrates computing environment 2300, display device 2360, and input device 2350 as separate devices for ease of identification only. Computing environment 2300, display device 2360, and input device 2350 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 2300 may be a set-top box, mobile device, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the disclosure and equivalents thereto.

What is claimed is:

1. A method executed by one or more computing devices for generating a data proliferation graph, the method comprising:

receiving, by at least one of the one or more computing devices, a selection of a target data store;

identifying, by at least one of the one or more computing devices, a plurality of data stores in a plurality of data propagation paths of data through the target data store and one or more other data stores;

dividing, by at least one of the one or more computing devices, the plurality of data stores into a plurality of proliferation levels corresponding to degrees of separation from the target data store and direction of data propagation relative to the target data store; and transmitting, by at least one of the one or more computing devices, a data proliferation graph in a user interface, the data proliferation graph comprising:

a target node corresponding to the target data store and located in a target column of the data proliferation graph, a proliferation path corresponding to a data propagation path in the plurality of data propagation paths, the proliferation path corresponding to a route taken by one or more data items through the target data store and one or more of the plurality of data stores, and a plurality of proliferation nodes located in a plurality of proliferation columns corresponding to the plurality of proliferation levels, the plurality of proliferation nodes corresponding to data stores in the proliferation path and one or more of: one or more immediate parents of the data stores in the proliferation path for an upstream route and one or more immediate children of the data stores in the proliferation path for a downstream route, wherein the data proliferation graph is configured to receive a user adjustment of the proliferation path which results in selection of a different data propagation path in the plurality of data propagation paths and is further configured to update the plurality of proliferation nodes transmitted within the data proliferation graph to correspond to data stores in the adjusted proliferation path and one or more of: one or more immediate parents of the data stores in the adjusted proliferation path for an upstream route and one or more immediate children of the data stores in the adjusted proliferation path for a downstream route.

2. The method of claim 1, wherein the plurality of data stores comprise a plurality of downstream data stores which have received data that was previously on the target data store, wherein the plurality of proliferation levels include a plurality of downstream levels corresponding to degrees of separation downstream from the target data store, and wherein the plurality of proliferation nodes correspond to data stores in the proliferation path and one or more immediate children of the data stores in the proliferation path.

3. The method of claim 1, wherein the plurality of data stores comprise a plurality of upstream data stores which have sent data that was subsequently on the target data store, wherein the plurality of proliferation levels include a plurality of upstream levels corresponding to degrees of separation upstream from the target data store, and wherein the plurality of proliferation nodes correspond to data stores in the proliferation path and one or more immediate parents of the data stores in the proliferation path.

4. The method of claim 1, wherein the proliferation path indicates one proliferation node in each of the plurality of proliferation columns and wherein proliferation nodes are sorted within each proliferation column in the plurality of proliferation columns based at least in part on a ranking criterion associated with that proliferation column.

5. The method of claim 4, wherein the ranking criterion is selected by a user.

6. The method of claim 4, wherein the ranking criterion comprises at least one of data volume, risk score, and jumps.

7. The method of claim 4, wherein each proliferation column in the plurality of proliferation columns is sorted such that a top ranked proliferation node for that proliferation column is a center proliferation node of the proliferation column.

8. The method of claim 4, wherein the proliferation path includes the top ranked proliferation node in each of the plurality of proliferation columns.

9. The method of claim 4, further comprising:
receiving, by at least one of the one or more computing devices, a selection of a new ranking criterion for a proliferation column in the plurality of proliferation columns; and
re-sorting, by at least one of the one or more computing devices, proliferation nodes within the column based at least in part on the new ranking criteria.

10. The method of claim 9, further comprising:
applying, by at least one of the one or more computing devices, the new ranking criterion to one or more additional proliferation columns in the plurality of proliferation columns; and
re-sorting, by at least one of the one or more computing devices, proliferation nodes within the one or more additional proliferation columns based at least in part on the new ranking criterion.

11. The method of claim 10, wherein the one or more additional proliferation columns comprise either: all proliferation columns which are downstream of the proliferation column when the proliferation column corresponds to a downstream route or all proliferation columns which are upstream of the proliferation column when the proliferation column corresponds to an upstream route.

12. The method of claim 1, wherein a visual attribute of each proliferation node in the plurality of proliferation nodes corresponds to an attribute of a data store corresponding to that proliferation node.

13. The method of claim 1, the data proliferation graph further comprising:
a first group of proliferation nodes of a proliferation column in the plurality of proliferation columns, wherein the first group of proliferation nodes excludes a second group of proliferation nodes of the proliferation column; and
one or more aggregate nodes combining the second group of proliferation nodes of the proliferation column.

14. The method of claim 13, wherein the first group comprises a predetermined number of top ranked proliferation nodes in the proliferation column.

15. The method of claim 1, wherein the adjusted proliferation path corresponds to a route taken by one or more second data items through the target data store and one or more of the plurality of data stores, the one or more second data items including at least one data item which is not in the one or more data items.

16. The method of claim 1, wherein the user adjustment is received through selection of a proliferation node in a proliferation column in the plurality of proliferation columns for inclusion in the proliferation path that is not already in the proliferation path.

17. The method of claim 16, wherein the selection results in removal of a different proliferation node in the proliferation column from the proliferation path.

18. The method of claim 1, wherein the user adjustment is received through selection of a new ranking criterion for a proliferation column in the plurality of proliferation columns which results in re-sorting of that proliferation column and placement of a proliferation node in that proliferation column within the proliferation path that is not already in the proliferation path.

19. The method of claim 1, further comprising:
transmitting, by at least one of the one or more computing devices, a macro view in the user interface, the macro view including a plurality of macro nodes corresponding to the plurality of data stores;
wherein a portion of the plurality of macro nodes which correspond to data stores in the proliferation path and one or more of: one or more immediate parents of the data stores in the proliferation path for an upstream route and one or more immediate children of the data stores in the proliferation path for a downstream route are marked within the macro view; and
wherein the macro view includes a focus window corresponding to the plurality of proliferation nodes.

20. The method of claim 19, further comprising:
receiving, by at least one of the one or more computing devices, a selection of a new focus window within the macro view; and
updating, by at least one of the one or more computing devices, the data proliferation graph to include a second plurality of proliferation nodes corresponding to data stores in the new focus window which are in the proliferation path and one or more of: one or more immediate parents of the data stores in the proliferation path for an upstream route and one or more immediate children of the data stores in the proliferation path for a downstream route.

21. The method claim 19, wherein the data proliferation graph is further configured to update the macro view to mark a portion of the plurality of macro nodes which correspond to data stores in the adjusted proliferation path and one or more of: one or more immediate parents of the data stores in the adjusted proliferation path for an upstream route and one or more immediate children of the data stores in the adjusted proliferation path for a downstream route.

22. The method of claim 1, wherein the plurality of data stores are identified based at least in part on metadata tags embedded in the data which track one or more locations of the data.

23. An apparatus for generating a data proliferation graph, the apparatus comprising:
one or more processors; and
one or more memories operatively coupled to at least one of the one or more processors and having instructions stored thereon that, when executed by at least one of the one or more processors, cause at least one of the one or more processors to:
receive a selection of a target data store;
identify a plurality of data stores in a plurality of data propagation paths of data through the target data store and one or more other data stores;
divide the plurality of data stores into a plurality of proliferation levels corresponding to degrees of separation from the target data store and direction of data propagation relative to the target data store; and
transmit a data proliferation graph in a user interface, the data proliferation graph comprising:
a target node corresponding to the target data store and located in a target column of the data proliferation graph,
a proliferation path corresponding to a data propagation path in the plurality of data propagation paths, the proliferation path corresponding to a route taken by one or more data items through the target data store and one or more of the plurality of data stores, and
a plurality of proliferation nodes located in a plurality of proliferation columns corresponding to the plurality of proliferation levels, the plurality of proliferation nodes corresponding to data stores in the proliferation path and one or more of: one or more immediate parents of the data stores in the proliferation path for an upstream route and one or more immediate children of the data stores in the proliferation path for a downstream route,
wherein the data proliferation graph is configured to receive a user adjustment of the proliferation path which results in selection of a different data propagation path in the plurality of data propagation paths and is further configured to update the plurality of proliferation nodes transmitted within the data proliferation graph to correspond to data stores in the adjusted proliferation path and one or more of: one or more immediate parents of the data stores in the adjusted proliferation path for an upstream route and one or more immediate children of the data stores in the adjusted proliferation path for a downstream route.

24. The apparatus of claim 23, wherein the plurality of data stores comprise a plurality of downstream data stores which have received data that was previously on the target data store, wherein the plurality of proliferation levels include a plurality of downstream levels corresponding to degrees of separation downstream from the target data store, and wherein the plurality of proliferation nodes correspond to data stores in the proliferation path and one or more immediate children of the data stores in the proliferation path.

25. The apparatus of claim 23, wherein the plurality of data stores comprise a plurality of upstream data stores which have sent data that was subsequently on the target data store, wherein the plurality of proliferation levels include a plurality of upstream levels corresponding to degrees of separation upstream from the target data store, and wherein the plurality of proliferation nodes correspond to data stores in the proliferation path and one or more immediate parents of the data stores in the proliferation path.

26. The apparatus of claim 23, wherein the proliferation path indicates one proliferation node in each of the plurality of proliferation columns and wherein proliferation nodes are sorted within each proliferation column in the plurality of proliferation columns based at least in part on a ranking criterion associated with that proliferation column.

27. The apparatus of claim 26, wherein the ranking criterion is selected by a user.

28. The apparatus of claim 26, wherein the ranking criterion comprises at least one of data volume, risk score, and jumps.

29. The apparatus of claim 26, wherein each proliferation column in the plurality of proliferation columns is sorted such that a top ranked proliferation node for that proliferation column is a center proliferation node of the proliferation column.

30. The apparatus of claim 26, wherein the proliferation path includes the top ranked proliferation node in each of the plurality of proliferation columns.

31. The apparatus of claim 26, wherein at least one of the one or more memories has further instructions stored thereon that, when executed by at least one of the one or more processors, cause at least one of the one or more processors to:
receive a selection of a new ranking criterion for a proliferation column in the plurality of proliferation columns; and
re-sort proliferation nodes within the column based at least in part on the new ranking criteria.

32. The apparatus of claim 31, wherein at least one of the one or more memories has further instructions stored thereon that, when executed by at least one of the one or more processors, cause at least one of the one or more processors to:
apply the new ranking criterion to one or more additional proliferation columns in the plurality of proliferation columns; and
re-sort proliferation nodes within the one or more additional proliferation columns based at least in part on the new ranking criterion.

33. The apparatus of claim 32, wherein the one or more additional proliferation columns comprise either: all proliferation columns which are downstream of the proliferation column when the proliferation column corresponds to a downstream route or all proliferation columns which are upstream of the proliferation column when the proliferation column corresponds to an upstream route.

34. The apparatus of claim 23, wherein a visual attribute of each proliferation node in the plurality of proliferation nodes corresponds to an attribute of a data store corresponding to that proliferation node.

35. The apparatus of claim 23, the data proliferation graph further comprising:
a first group of proliferation nodes of a proliferation column in the plurality of proliferation columns, wherein the first group of proliferation nodes excludes a second group of proliferation nodes of the proliferation column; and
one or more aggregate nodes combining the second group of proliferation nodes of the proliferation column.

36. The apparatus of claim 35, wherein the first group comprises a predetermined number of top ranked proliferation nodes in the proliferation column.

37. The apparatus of claim 23, wherein the adjusted proliferation path corresponds to a route taken by one or more second data items through the target data store and one or more of the plurality of data stores, the one or more second data items including at least one data item which is not in the one or more data items.

38. The apparatus of claim 23, wherein the user adjustment is received through selection of a proliferation node in a proliferation column in the plurality of proliferation columns for inclusion in the proliferation path that is not already in the proliferation path.

39. The apparatus of claim 38, wherein the selection results in removal of a different proliferation node in the proliferation column from the proliferation path.

40. The apparatus of claim 23, wherein the user adjustment is received through selection of a new ranking criterion for a proliferation column in the plurality of proliferation columns which results in re-sorting of that proliferation column and placement of a proliferation node in that proliferation column within the proliferation path that is not already in the proliferation path.

41. The apparatus of claim 23, wherein at least one of the one or more memories has further instructions stored thereon that, when executed by at least one of the one or more processors, cause at least one of the one or more processors to:
transmit a macro view in the user interface, the macro view including a plurality of macro nodes corresponding to the plurality of data stores;
wherein a portion of the plurality of macro nodes which correspond to data stores in the proliferation path and one or more of: one or more immediate parents of the data stores in the proliferation path for an upstream route and one or more immediate children of the data stores in the proliferation path for a downstream route are marked within the macro view; and
wherein the macro view includes a focus window corresponding to the plurality of proliferation nodes.

42. The apparatus of claim 41, wherein at least one of the one or more memories has further instructions stored thereon that, when executed by at least one of the one or more processors, cause at least one of the one or more processors to:
receive a selection of a new focus window within the macro view; and
update data proliferation graph to include a second plurality of proliferation nodes corresponding to data stores in the new focus window which are in the proliferation path and one or more of: one or more immediate parents of the data stores in the proliferation path for an upstream route and one or more immediate children of the data stores in the proliferation path for a downstream route.

43. The apparatus of claim 41, wherein the data proliferation graph is further configured to update the macro view to mark a portion of the plurality of macro nodes which correspond to data stores in the adjusted proliferation path and one or more of: one or more immediate parents of the data stores in the adjusted proliferation path for an upstream route and one or more immediate children of the data stores in the adjusted proliferation path for a downstream route.

44. The apparatus of claim 23, wherein the plurality of data stores are identified based at least in part on metadata tags embedded in the data which track one or more locations of the data.

45. At least one non-transitory computer-readable medium storing computer-readable instructions that, when executed by one or more computing devices, cause at least one of the one or more computing devices to:
receive a selection of a target data store;
identify a plurality of data stores in a plurality of data propagation paths of data through the target data store and one or more other data stores;
divide the plurality of data stores into a plurality of proliferation levels corresponding to degrees of separation from the target data store and direction of data propagation relative to the target data store; and
transmit a data proliferation graph in a user interface, the data proliferation graph comprising:
a target node corresponding to the target data store and located in a target column of the data proliferation graph,
a proliferation path corresponding to a data propagation path in the plurality of data propagation paths, the proliferation path corresponding to a route taken by one or more data items through the target data store and one or more of the plurality of data stores, and
a plurality of proliferation nodes located in a plurality of proliferation columns corresponding to the plurality of proliferation levels, the plurality of proliferation nodes corresponding to data stores in the proliferation path and one or more of: one or more immediate parents of the data stores in the proliferation path for an upstream route and one or more immediate children of the data stores in the proliferation path for a downstream route,
wherein the data proliferation graph is configured to receive a user adjustment of the proliferation path which results in selection of a different data propagation path in the plurality of data propagation paths and is further configured to update the plurality of proliferation nodes transmitted within the data proliferation graph to correspond to data stores in the adjusted proliferation path and one or more of: one or more immediate parents of the data stores in the adjusted proliferation path for an upstream route and one or more immediate children of the data stores in the adjusted proliferation path for a downstream route.

46. The at least one non-transitory computer-readable medium of claim 45, wherein the plurality of data stores comprise a plurality of downstream data stores which have received data that was previously on the target data store, wherein the plurality of proliferation levels include a plurality of downstream levels corresponding to degrees of separation downstream from the target data store, and wherein the plurality of proliferation nodes correspond to data stores in the proliferation path and one or more immediate children of the data stores in the proliferation path.

47. The at least one non-transitory computer-readable medium of claim 45, wherein the plurality of data stores comprise a plurality of upstream data stores which have sent data that was subsequently on the target data store, wherein the plurality of proliferation levels include a plurality of upstream levels corresponding to degrees of separation upstream from the target data store, and wherein the plurality of proliferation nodes correspond to data stores in the proliferation path and one or more immediate parents of the data stores in the proliferation path.

48. The at least one non-transitory computer-readable medium of claim 45, wherein the proliferation path indicates one proliferation node in each of the plurality of proliferation columns and wherein proliferation nodes are sorted within each proliferation column in the plurality of proliferation columns based at least in part on a ranking criterion associated with that proliferation column.

49. The at least one non-transitory computer-readable medium of claim 48, wherein the ranking criterion is selected by a user.

50. The at least one non-transitory computer-readable medium of claim 48, wherein the ranking criterion comprises at least one of data volume, risk score, and jumps.

51. The at least one non-transitory computer-readable medium of claim 48, wherein each proliferation column in the plurality of proliferation columns is sorted such that a top ranked proliferation node for that proliferation column is a center proliferation node of the proliferation column.

52. The at least one non-transitory computer-readable medium of claim 48, wherein the proliferation path includes the top ranked proliferation node in each of the plurality of proliferation columns.

53. The at least one non-transitory computer-readable medium of claim 45, wherein a visual attribute of each proliferation node in the plurality of proliferation nodes corresponds to an attribute of a data store corresponding to that proliferation node.

54. The at least one non-transitory computer-readable medium of claim 45, the data proliferation graph further comprising:
   a first group of proliferation nodes of a proliferation column in the plurality of proliferation columns, wherein the first group of proliferation nodes excludes a second group of proliferation nodes of the proliferation column; and
   one or more aggregate nodes combining the second group of proliferation nodes of the proliferation column.

55. The at least one non-transitory computer-readable medium of claim 54, wherein the first group comprises a predetermined number of top ranked proliferation nodes in the proliferation column.

56. The at least one non-transitory computer-readable medium of claim 45, wherein the adjusted proliferation path corresponds to a route taken by one or more second data items through the target data store and one or more of the plurality of data stores, the one or more second data items including at least one data item which is not in the one or more data items.

57. The at least one non-transitory computer-readable medium of claim 45, wherein the user adjustment is received through selection of a proliferation node in a proliferation column in the plurality of proliferation columns for inclusion in the proliferation path that is not already in the proliferation path.

58. The at least one non-transitory computer-readable medium of claim 57, wherein the selection results in removal of a different proliferation node in the proliferation column from the proliferation path.

59. The at least one non-transitory computer-readable medium of claim 45, wherein the user adjustment is received through selection of a new ranking criterion for a proliferation column in the plurality of proliferation columns which results in re-sorting of that proliferation column and placement of a proliferation node in that proliferation column within the proliferation path that is not already in the proliferation path.

60. The at least one non-transitory computer-readable medium of claim 45, further storing computer-readable instructions that, when executed by at least one of the one or more computing devices, cause at least one of the one or more computing devices to:
   transmit a macro view in the user interface, the macro view including a plurality of macro nodes corresponding to the plurality of data stores;
   wherein a portion of the plurality of macro nodes which correspond to data stores in the proliferation path and one or more of: one or more immediate parents of the data stores in the proliferation path for an upstream route and one or more immediate children of the data stores in the proliferation path for a downstream route are marked within the macro view; and
   wherein the macro view includes a focus window corresponding to the plurality of proliferation nodes.

61. The at least one non-transitory computer-readable medium of claim 60, further storing computer-readable instructions that, when executed by at least one of the one or more computing devices, cause at least one of the one or more computing devices to:
   receive a selection of a new focus window within the macro view; and
   update the data proliferation graph to include a second plurality of proliferation nodes corresponding to data stores in the new focus window which are in the proliferation path and one or more of: one or more immediate parents of the data stores in the proliferation path for an upstream route and one or more immediate children of the data stores in the proliferation path for a downstream route.

62. The at least one non-transitory computer-readable medium of claim 60, wherein the data proliferation graph is further configured to update the macro view to mark a portion of the plurality of macro nodes which correspond to data stores in the adjusted proliferation path and one or more of: one or more immediate parents of the data stores in the adjusted proliferation path for an upstream route and one or more immediate children of the data stores in the adjusted proliferation path for a downstream route.

63. The at least one non-transitory computer-readable medium of claim 48, further storing computer-readable instructions that, when executed by at least one of the one or more computing devices, cause at least one of the one or more computing devices to:
   receive a selection of a new ranking criterion for a proliferation column in the plurality of proliferation columns; and
   re-sort proliferation nodes within the column based at least in part on the new ranking criteria.

64. The at least one non-transitory computer-readable medium of claim 63, further storing computer-readable instructions that, when executed by at least one of the one or more computing devices, cause at least one of the one or more computing devices to:
   apply the new ranking criterion to one or more additional proliferation columns in the plurality of proliferation columns; and
   re-sort proliferation nodes within the one or more additional proliferation columns based at least in part on the new ranking criterion.

65. The at least one non-transitory computer-readable medium of claim 64, wherein the one or more additional proliferation columns comprise either: all proliferation columns which are downstream of the proliferation column when the proliferation column corresponds to a downstream route or all proliferation columns which are upstream of the proliferation column when the proliferation column corresponds to an upstream route.

66. The at least one non-transitory computer-readable medium of claim 45, wherein the plurality of data stores are identified based at least in part on metadata tags embedded in the data which track one or more locations of the data.

* * * * *